United States Patent
Matsuzaki et al.

(10) Patent No.: US 7,441,117 B2
(45) Date of Patent: Oct. 21, 2008

(54) GROUP FORMATION/MANAGEMENT SYSTEM, GROUP MANAGEMENT DEVICE, AND MEMBER DEVICE

(75) Inventors: Natsume Matsuzaki, Mino (JP); Toshihisa Abe, Izumisano (JP); Toshihisa Nakano, Neyagwa (JP); Yuichi Futa, Osaka (JP); Masaya Miyazaki, Ikeda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 688 days.

(21) Appl. No.: 10/649,678

(22) Filed: Aug. 28, 2003

(65) Prior Publication Data

US 2004/0093523 A1    May 13, 2004

(30) Foreign Application Priority Data

Sep. 5, 2002    (JP)    ............................ 2002-260520

(51) Int. Cl.
*H04L 9/32* (2006.01)
(52) U.S. Cl. ......................................... 713/163; 726/2
(58) Field of Classification Search ............... 726/2; 713/163
See application file for complete search history.

(56) References Cited

U.S. PATENT DOCUMENTS

| | | | | |
|---|---|---|---|---|
| 5,649,187 A | * | 7/1997 | Hornbuckle | 707/10 |
| 5,987,607 A | | 11/1999 | Tsumura | |
| 6,158,004 A | * | 12/2000 | Mason et al. | 713/150 |
| 2001/0039581 A1 | | 11/2001 | Deng et al. | |
| 2002/0013772 A1 | * | 1/2002 | Peinado | 705/51 |
| 2002/0038360 A1 | | 3/2002 | Andrews et al. | |
| 2003/0112977 A1 | * | 6/2003 | Ray et al. | 380/270 |

FOREIGN PATENT DOCUMENTS

GB    2343025    * 10/1998

(Continued)

OTHER PUBLICATIONS

Yang, Y. R. et al.: "Reliable Group Rekeying: A Performance Analysis" Computer Communication Review, Association For Computing Machinery. New York, US, vol. 31, No. 4, Oct. 2001, pp. 27-38.

(Continued)

*Primary Examiner*—Gilberto Barron, Jr.
*Assistant Examiner*—Devin Almeida
(74) *Attorney, Agent, or Firm*—Wenderoth, Lind & Ponack, L.L.P.

(57) ABSTRACT

A group formation/management system rigidly sets a group range, allows contents to be used freely among member devices in the group, and includes one or more registered member devices for holding common secret information unique to the group, a new member device for transmitting a request for registration in the group and receiving and holding common secret information, and a group management device for receiving the registration request from the new member device and, when the number of registered member devices is less than the maximum number of registerable member devices, outputting the common secret information to the new member device. Furthermore, because member devices are authenticated using the common secret information when contents are to be used, and contents are only delivered if the authentication is successful, member devices that do not hold the common secret information (i.e. unregistered member devices) can be prevented from using contents.

40 Claims, 18 Drawing Sheets

FOREIGN PATENT DOCUMENTS

| | | | |
|---|---|---|---|
| GB | 2 343 025 | | 4/2000 |
| GB | 2353682 | * | 6/2000 |
| GB | 2 353 682 | | 2/2001 |
| JP | 92-97798 | | 11/1997 |
| WO | 01/31839 | | 5/2001 |
| WO | 01/52234 | | 7/2001 |

OTHER PUBLICATIONS

Steiner, M. et al.: "Cliques: A New Approach to Group Key Agreement" Distributed Computing Systems, 1998. Proceedings. 18th International Conference On Amsterdam, Netherlands May 26-29, 1998, Los Alamitos, CA, USA, IEEE Comput. Soc, US, May 26, 1998, pp. 380-387.

Canetti, R. et al.: "Multicast security: A Taxonomy and Some Efficient Constructions" INFOCOM '99. Eighteenth Annual Joint Conference of the IEEE Computer and Communications Societies. Proceedings. IEEE New York, NY, USA, Mar. 21-25, 1999, Piscataway, NJ, USA, IEEE, US, Mar. 21, 1999, pp. 708-716.

Yih Huang et al.: "Group Leader Election Under Link-state Routing" Network Protocols, 1997. Proceedings., 1997 International Conference on Atlanta, GA, USA Oct. 28-31, 1997, Los Alamitos, CA, USA, IEEE Comput. Soc, US, Oct. 28, 1997, pp. 95-104.

Dunigan, Tom et al.: "Group Key Management" Internet Citation, Sep. 30, 198, pp. 1-27.

S. Setia et al., "Kronos: A Scalable Group Re-Keying Approach for Secure Multicast", Security and Privacy, 2000, S&P 2000, Proceedings, 2000 IEEE Symposium on Berkeley, CA, USA May 14-17, 2000, Los Alamitos, CA, USA, IEEE Comput. Soc, US, May 14, 2000, pp. 215-228.

C. K. Wong et al., "Keystone: A Group Key Management Service", Proceedings International Conference on Telecommunications, May 2000, pp. 1-6.

* cited by examiner

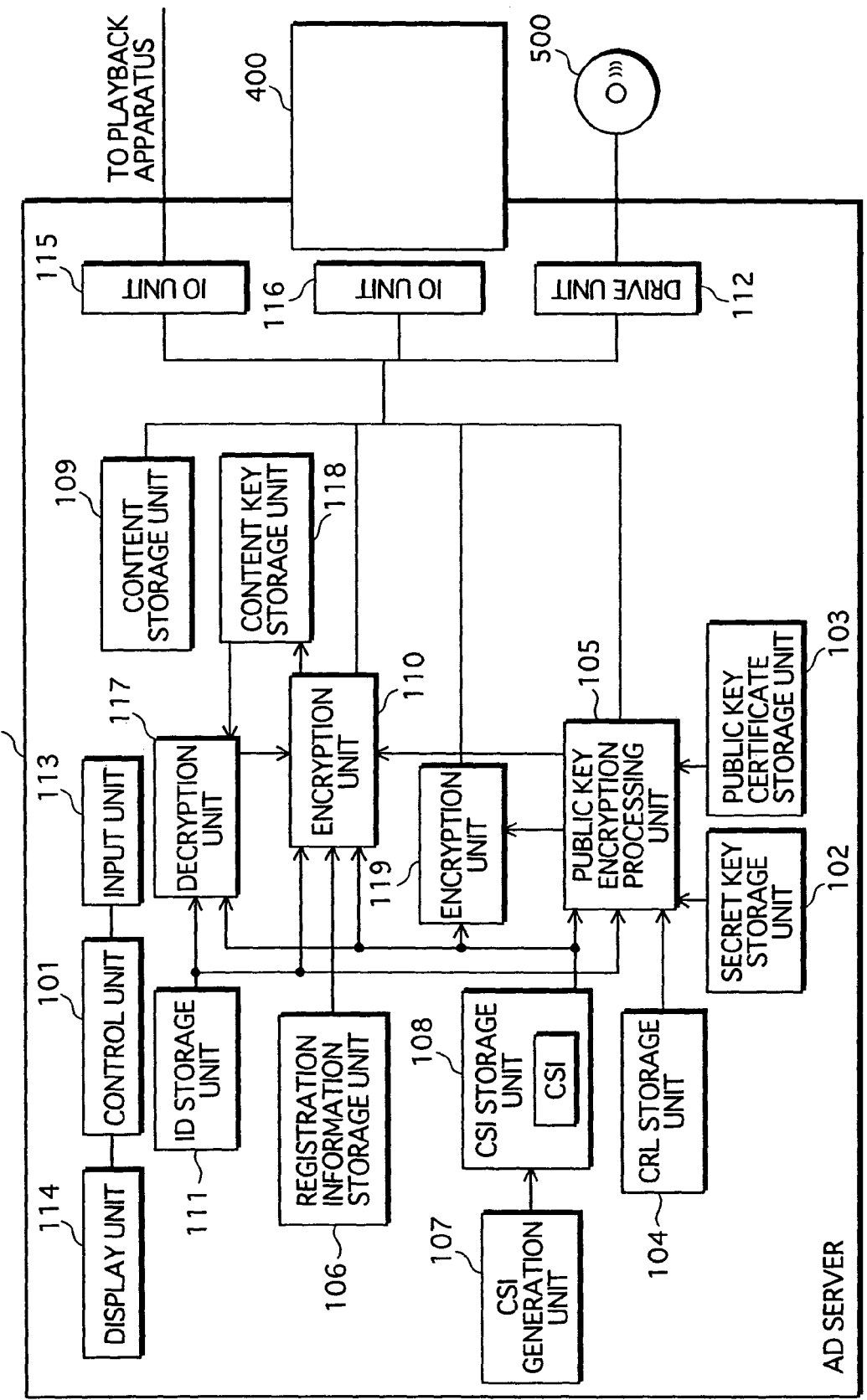

FIG.3A

| REGISTRATION INFORMATION | |
|---|---|
| DEVICE ID | |
| | |
| MAXIMUM | 2 |
| REGISTERED | 0 |
| REMAINING | 2 |
| IC CARD ID | ID_4 |

FIG.3B

| REGISTRATION INFORMATION | |
|---|---|
| DEVICE ID | ID_2 |
| | ID_3 |
| MAXIMUM | 2 |
| REGISTERED | 2 |
| REMAINING | 0 |
| IC CARD ID | ID_4 |

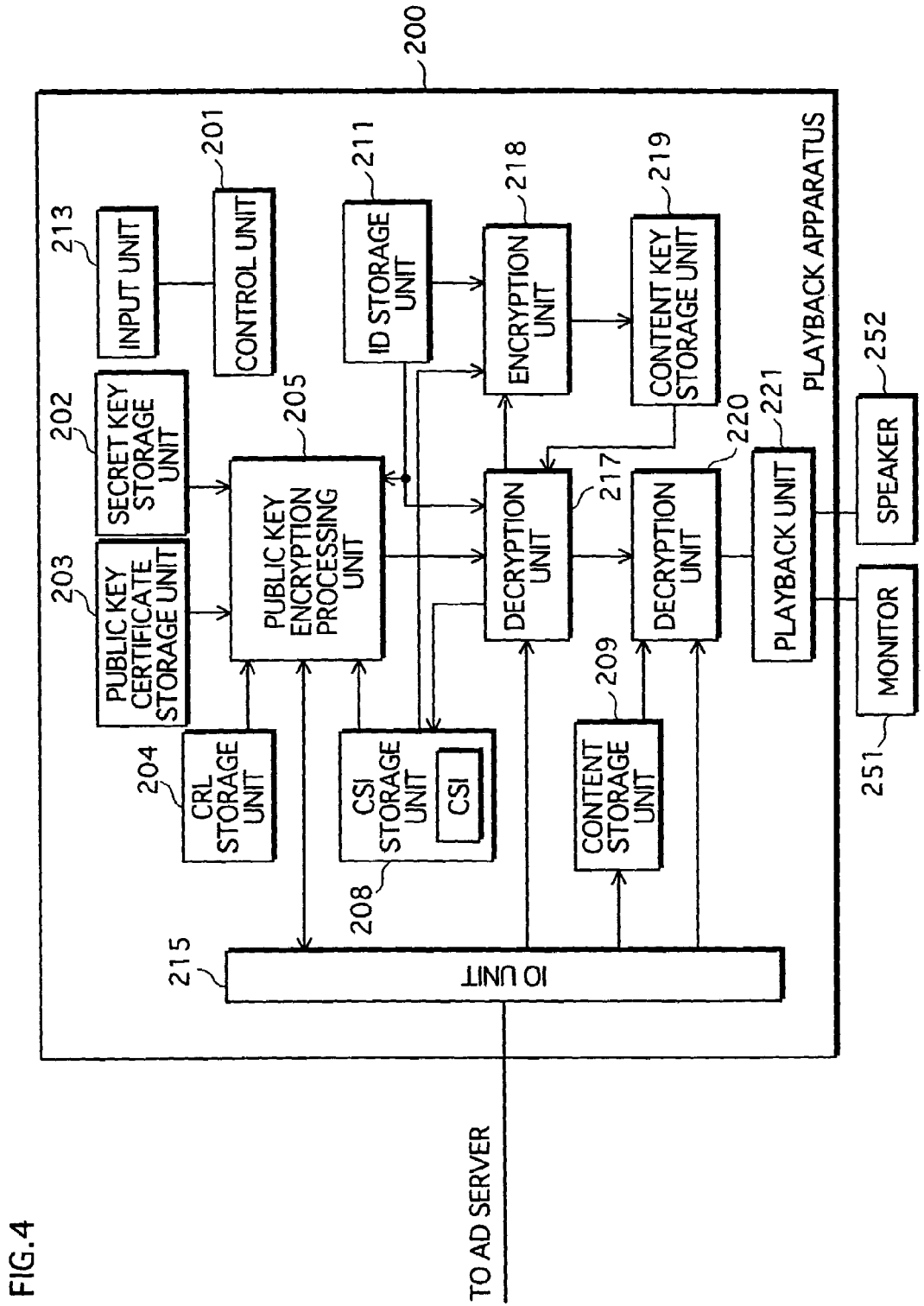

ON-VEHICLE REGISTRATION (2)

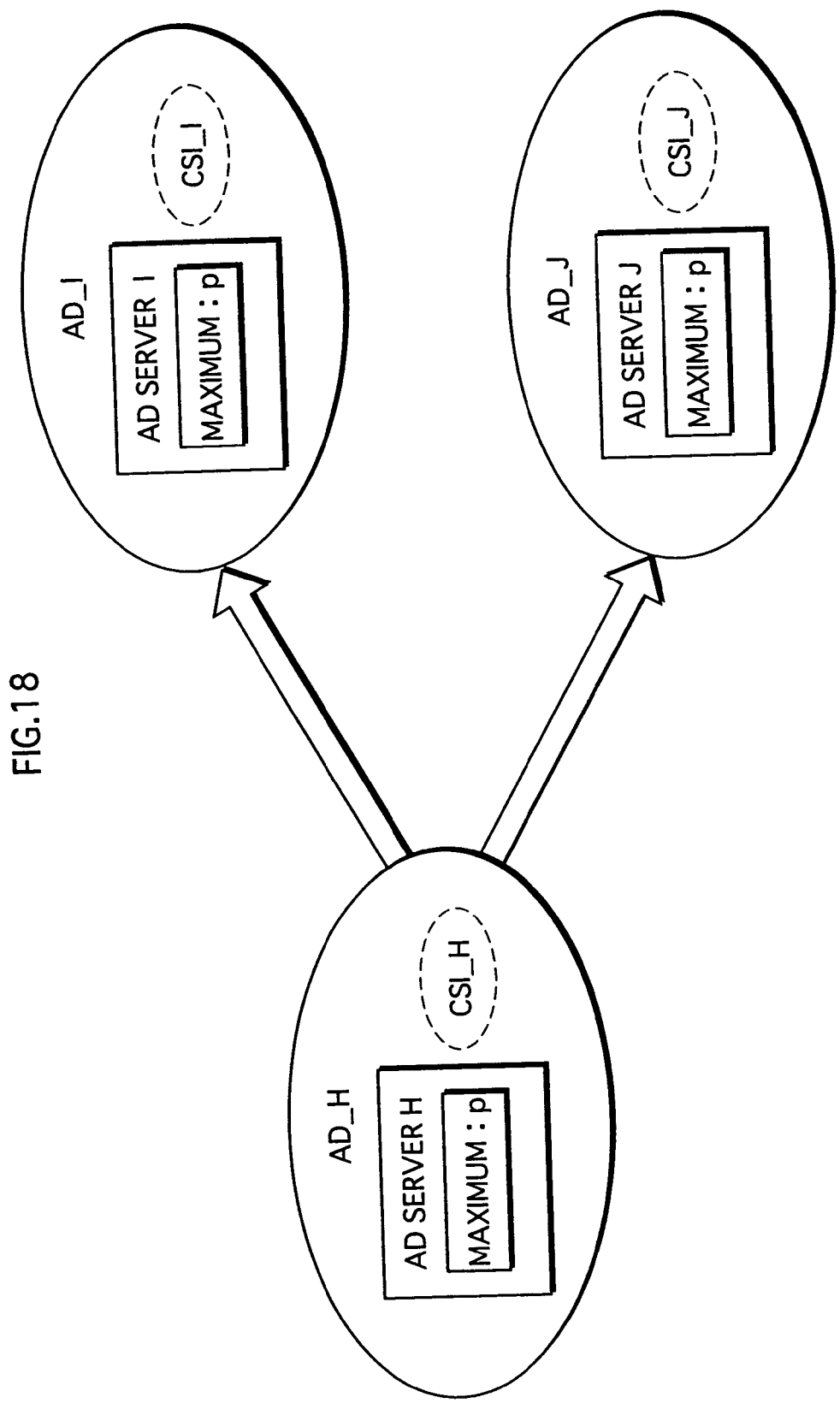

GROUP FORMATION/MANAGEMENT SYSTEM, GROUP MANAGEMENT DEVICE, AND MEMBER DEVICE

This application is based on an application no. 2002-260520 filed in Japan, the content of which is hereby incorporated by reference.

BACKGROUND OF THE INVENTION

1. Field of the Invention

The present invention relates to a group formation/management system that forms and manages groups within which mutual use of digital contents is possible.

2. Related Art

In recent years, the easy acquisition of digital copyrighted works (hereinafter "contents"), such as music, videos, games and so forth, has become possible as a result of circulation using the Internet, digital broadcast, package media and the like.

Unexamined Japanese patent application no. 2002-169726 discloses a music data management system whose object is to enable use of contents by desiring information processing apparatuses, while preventing use by third parties not having legitimate rights.

In this music data management system, a plurality of personal computers (hereafter "PCs") each transmit a credit card number or the like to an approved server together with the ID of a computer management program of the PC.

The server receives the ID and the credit card number, and sorts PCs having the same credit card number into the same group. The PCs and their users are registered by recording the IDs and credit card numbers with respect to each group. After registration, the server transmits a group key to each PC together with the ID and password of the corresponding group.

Each PC stores the received group key, group ID and password.

In this way, PCs having the same group key are able to transmit/receive contents using the group key.

With this technology, any device is registerable as an in-group device, and it is possible to freely increase the number of devices registered in any one group.

Furthermore, 5C *Digital Transmission Content Protection White Paper* (Revision 1.0, Jul. 14, 1998) discloses a specification called digital transmission content protection (DTCP).

DTCP is a protection specification for digital contents delivered via a bus standardized by IEEE 1394, which is a high-speed serial bus standard. Each device that uses contents has a secret key corresponding to the device distributed on the basis of a contract with a manager known as the Digital Transmission Licensing Administrator (DTLA). When contents are to be viewed, mutual authentication is conducted between a transmitting device and a receiving device using the respective secret key, and if authentication is successful, the receiving device is able to view the content.

With this technology, as long as a device receives distribution of a secret key from the DTLA, it is possible, at a time of content usage, for a different device to form a group and use contents.

As such, according to technology disclosed in unexamined Japanese patent application no. 2002-169726 and in 5C *Digital Transmission Content Protection White Paper* (Revision 1.0, Jul. 14, 1998), it is desirable, from the viewpoint of copyright protection of material whose content usage is permitted among devices included in a group, to rigidly control the devices forming a group, and from the viewpoint of usability for the user, it is desirable to be able to use contents freely over as wide a scope as possible, using IP (Internet Protocol) for example, rather than only a scope whose transmission range is physically restricted, as is the case with an IEEE 1394 bus.

SUMMARY OF THE INVENTION

In view of the above issues, the present invention aims to provide a group formation/management system that rigidly sets the parameters of a group, while allowing the free usage of contents among devices in the group, and to provide a group management device and a member device.

To achieve the above object, a group formation/management system of the present invention includes: one or more registered member devices operable to hold common secret information unique to a group; a new member device operable to transmit a request for registration to the group, and to receive and hold the common secret information; and a group management device operable to receive the registration request from the new member device, and when a registered number of member devices is less than a maximum number of member devices registerable in the group, to register the new member device and output the common secret information to the new member device.

Also, a group management device of the present invention manages a group, and includes: a reception unit operable to receive from a member device, a request for registration to the group; a judging unit operable, if the member device is authenticated as being a legitimate device, to judge whether a registered number of member devices is less than a maximum number of member devices registerable in the group, and to register the member device when judged in the affirmative; and a communication unit operable, when the judging unit judges in the affirmative, to output to the member device, common secret information unique to the group.

Also, a member device of the present invention uses a content after registering in a group managed by a group management device, and includes: a requesting unit operable to request the group management device for registration to the group; a receiving unit operable to be authenticated by the group management device, and to receive from the group management device, common secret information unique to the group; and a holding unit operable to hold the received common secret information.

According to these structures, because common secret information is outputted to a new member device if the registered number of devices is less than the maximum registerable number, it is possible to restrict the number of member devices registering in a group, and thus rigidly set the parameters of the group.

Here, the group management device may further include a content storage unit operable to store therein a content key and an encrypted content encrypted using the content key; and an encryption unit operable to encrypt the content key using a key generated based on the common secret information, to generate an encrypted content key, and the communication unit may output the encrypted content and the encrypted content key to the member device.

Also, in the member device, the requesting unit may request the group management device for delivery of the content, the receiving unit may receive from the group management device, an encrypted content generated by encrypting the content using a content key, and an encrypted content key generated by encrypting the content key using an encryption key generated based on the common secret information, and the member device may further include a decryption unit operable to generate a decryption key the same as the encryption key, based on the common secret information, to decrypt the encrypted content key using the decryption key to obtain a content key, and to decrypt the encrypted content using the content key to obtain a content.

According to these structures, because content keys are transmitted after being encrypted using common secret information at a time of content usage, it is possible to prevent the use of contents by out-group devices, since an encrypted content key cannot be decrypted by devices that do not hold the common secret information (i.e. member devices not registered in the group).

Also, a registration device of the present invention registers a member device in a group managed by a group management device, and includes: a holding unit operable to receive from the group management device and hold, common secret information unique to the group; and a notifying unit operable, when the registration device is connected to the member device, to notify the common secret information to the member device.

According to this structure, it is also possible for member devices that do not have the function of direct communication with a group management device to register with the group management device.

BRIEF DESCRIPTION OF THE DRAWINGS

These and other objects, advantages and features of the present invention will become apparent from the following description thereof taken in conjunction with the accompanying drawings that illustrate a specific embodiment of the invention.

In the drawings:

FIG. 2 is a block diagram showing a structure of an AD server 100;

FIG. 3 shows a structure of registration information;

FIG. 4 is a block diagram showing a structure of a playback apparatus 200;

FIG. 8 is a flowchart showing SAC establishment processing (cont. from FIG. 7);

FIG. 18 shows conceptually the division of a single group to form a plurality of groups.

DETAILED DESCRIPTION OF THE PREFERRED EMBODIMENT

An embodiment of the present invention will now be described in detail with reference to the drawings.

1. Structure of Group Formation/Management System

Figure 1:
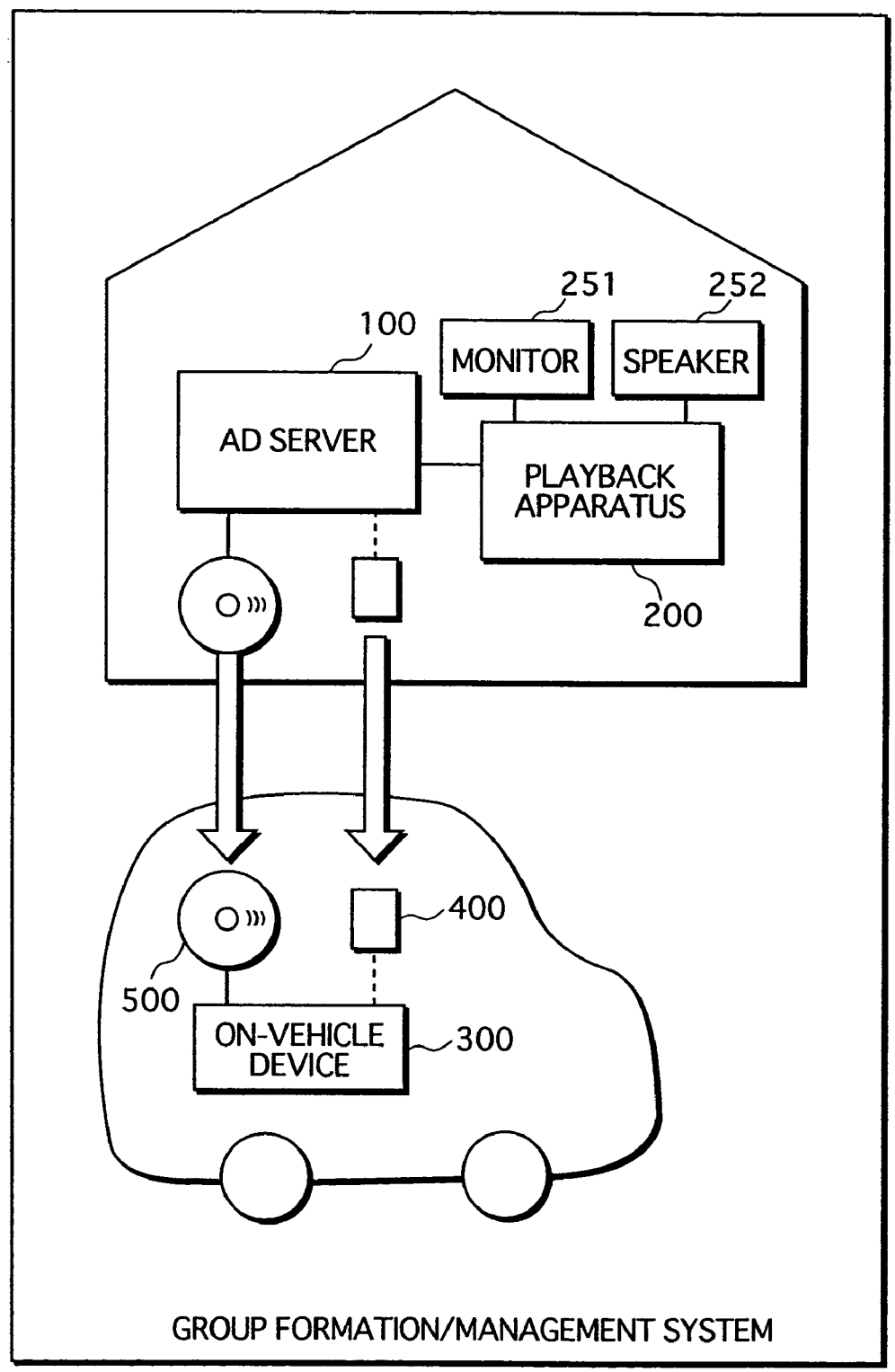
FIG. 1 is a block diagram showing an overall structure of a group formation/management system 1.

As shown in FIG. 1, a group formation/management system 1 is structured from an authorized domain (AD) server 100, a playback apparatus 200, an on-vehicle device 300, an IC card 400, and a DVD 500.

AD server 100 and playback apparatus 200, which is connected to a monitor 251 and a speaker 252, are disposed in a user's home and are connected online. On-vehicle device 300 is mounted in a vehicle owned by the user. IC card 400 and DVD 500 are connectable to AD server 100 and on-vehicle device 300. IC card 400 is affiliated with AD server 100, and AD server 100 only operates when IC card 400 is connected thereto.

Group formation/management system 1 is a system in which AD server 100 manages an authorized domain (AD), being a range within which content usage is permitted.

AD server 100 receives and manages the registration of client devices, and AD server 100 and registered client devices share common secret information (CSI) generated by AD server 100. Mutual authentication using shared CSI is conducted among devices within the same authorized domain, and when authorization is successful, transmission/reception, copying and the like of contents is conducted among these devices. Because the CSI differs between authorized domains, devices not holding the CSI of the authorized domain managed by AD server 100 cannot transmit/receive or copy contents available within the authorized domain of AD server 100.

Playback apparatus 200 is connected to AD server 100 and is thus able to conduct authentication and to register as a client device. Also, on-vehicle device 300, although not connected to AD server 100, is able to register as a client device by having CSI stored on IC card 400 and notifying the CSI from IC card 400 to on-vehicle device 300.

1.1 Structure of AD Server 100

As shown in FIG. 2, AD server 100 is structured from a control unit 101, a secret-key storage unit 102, a public-key-certificate storage unit 103, a CRL storage unit 104, a public-key-encryption processing unit 105, a registration-information storage unit 106, a CSI generation unit 107, a CSI storage unit 108, a content storage unit 109, an encryption unit 110, an ID storage unit 111, a drive unit 112, an input unit 113, a display unit 114, an input/output (IO) unit 115, an input/output (IO) unit 116, a decryption unit 117, a content-key storage unit 118, and an encryption unit 119.

AD server 100 is specifically a computer system structured from a microprocessor, a ROM, a RAM, a hard disk unit and the like. A computer program is stored on the RAM or the hard disk unit. AD server 100 carries out functions as a result of the microprocessor operating in accordance with the computer program.

AD server 100 conducts processing to register devices, manage copying of CSI and withdrawals, deliver contents, and copy contents.

Each of the elements will now be described.

(1) IO Unit 115, 116, Drive Unit 112

IO unit 115 conducts transmission/reception of data with playback apparatus 200. IO unit 116, when the connection of IC card 400 is detected, outputs the detection to control unit 101. Also, IO unit 116 conducts transmission/reception of data with IC card 400. Drive unit 112 writes/reads data to/from DVD 500.

(2) Secret-Key Storage Unit 102, Public-Key-Certificate Storage Unit 103, CRL Storage Unit 104, Content Storage Unit 109, ID Storage Unit 111, Content-Key Storage Unit 118

ID storage unit 111 stores an ID_1, which is an identifier (ID) unique to AD server 100.

Public-key-certificate storage unit 103 stores a public key certificate (PKC) Cert_1.

PKC Cert_1 certifies that a public key PK_1 is the legitimate public key of AD server 100. PKC Cert_1 includes signature data Sig_CA1, public key PK_1, and ID_1. Signature data Sig_CA1 is generated by a certification authority (CA) performing a signature algorithm S on public key PK_1 and ID_1. Here, a CA is a reliable third party authority, and issues public key certificates certifying the legitimacy of the public keys of devices belonging to group formation/management system 1. Moreover, signature algorithm S is, as one example, an ElGamal signature over a finite field. Since ElGamal signatures are known technology, a description is omitted here.

Secret-key storage unit 102 is a tamper-resistant area that cannot be viewed from outside, and stores a secret key SK_1 corresponding to public key PK_1.

CRL storage unit 104 stores a certificate revocation list (CRL). A CRL is a list, issued by a CA, in which are registered the IDs of invalidated devices, which are devices that have conducted improper processing, devices whose secret key has been disclosed, and the like. Moreover, it need not be device IDs that are registered in a CRL, but may be the serial numbers of public key certificates held by invalidated devices. A CRL is distributed to devices, for example, via a broadcast, the Internet or stored on a recording medium such as DVD, and devices obtain the most recent CRL. Moreover, a detailed discloser of CRLs can be found in the American National Standards Institute's ANSI X9.57: "Public Key Cryptography for the Financial Services Industry: Certificate Management," 1997.

Content storage unit 109 stores encrypted contents encrypted using content keys. Moreover, although the method of acquiring contents is not the subject of the present invention and a description is thus omitted here, acquisition methods include, for example, acquiring contents using the Internet, broadcasts or the like, or acquiring contents from a recording medium such as a DVD.

Content-key storage unit 118 receives an encrypted content key a from encryption unit 110, and stores the encrypted content key a.

(3) Public-Key-Encryption Processing Unit 105

Public-key-encryption processing unit 105 conducts authentication at a time of communicating with another device, and establishes a secure authenticated channel (SAC). A SAC refers to a safe communication channel that enables encrypted communication. As a result of processing to establish a SAC, it is possible to confirm that the device being authenticated is a legitimate device recognized by the CA. A detailed description of the SAC establishment method is given later. Also, unit 105, as a result of the authentication, shares a session key SK.

(4) Registration-Information Storage Unit 106

Registration-information storage unit 106 is a tamper-resistant area, and stores registration information as shown in FIG. 3A. Registration information is information for managing the number of devices registerable in AD server 100 and the ID of registered devices, and is structured from DEVICE ID, MAXIMUM, REGISTERED, REMAINING, and IC CARD ID.

DEVICE ID is an area storing the ID of devices registered in AD server 100. When playback apparatus 200 and on-vehicle device 300 are registered in AD server 100, an ID_2 and an ID_3, being the respective IDs of devices 200 and 300, are stored, as shown in FIG. 3B.

MAXIMUM shows the maximum number of devices registerable in AD server 100, the maximum number being two in the present embodiment. REGISTERED shows the number of devices already registered in AD server 100. REMAINING shows the remaining number of devices registerable in AD server 100.

In an initial state in which no client devices are registered in the authorized domain managed by AD server 100, the registered number (REGISTERED) is "0", and the remaining number (REMAINING) has the same value as the maximum number (MAXIMUM). When a client device is registered in the authorized domain by AD server 100, "1" is added to the registered number, and "1" is subtracted from the remaining number.

IC CARD ID prestores the ID of IC card 400 affiliated with AD server 100, and cannot be rewritten.

(5) CSI Generation Unit 107, CSI Storage Unit 108

CSI storage unit 108 is a tamper-resistant area storing a CSI that cannot be read from outside, and stores, when no devices are registered in AD server 100, "0" as a value showing that no devices are registered.

CSI generation unit 107 generates CSI when a device is initially registered in AD server 100, under the control of control unit 101. Also, when all of devices withdraw, CSI storage unit 108 rewrites the stored value to "0".

Here, CSI is arbitrary data generated by CSI generation unit 107, and has a 200-bit length in the present embodiment. Moreover, the bit length of the CSI is not limited to this, and may be any length that is not readily estimatable, and that cannot be easily tested.

CSI generation unit 107 stores generated CSI in CSI storage unit 108. Also, unit 107 outputs generated CSI to IC card 400 when connected.

Moreover, CSI may be updated regularly or irregularly.

(6) Encryption Unit 110, Encryption Unit 119

Encryption unit 119, at a time of playback apparatus 200 being registered and under the control of control unit 101, performs an encryption algorithm E on CSI using a session key SK received from public-key-encryption processing unit 105 to generate encrypted CSI, and transmits the encrypted CSI to playback apparatus 200 via IO unit 115. Here, encryption algorithm E is, as one example, a Data Encryption Standard (DES) algorithm. Since DES algorithms are known technology, a description is omitted here.

Encryption unit 110, at a time of storing a content key in content-key storage unit 118, reads ID_1 from ID storage unit 111 and reads CSI from CSI storage unit 108. Unit 110 concatenates the read ID_1 and CSI in the stated order to generate an encryption key a, performs an encryption algorithm E on the content key using encryption key a to generate encrypted content key a, and outputs encrypted content key a to content-key storage unit 118.

Encryption unit 110, at a time of writing an encrypted content onto DVD 500 and under the control of control unit 101, reads ID__2 and ID__3, which are the IDs of the registered devices, from DEVICE ID of the registered information in registration-information storage unit 106. Unit 110 concatenates ID__2 and CSI in the stated order to generate an encryption key b, and concatenates ID__3 and CSI in the stated order to generate an encryption key c. An encrypted content key b and an encrypted content key c are generated respectively using encryption key b and encryption key c, and written to DVD 500.

(7) Decryption Unit 117

Decryption unit 117, under the control of control unit 101, reads ID__1 stored in ID storage unit 111 and reads CSI stored in CSI storage unit 108. Unit 117 performs a decryption algorithm D on encrypted content key a read from content-key storage unit 118, using a decryption key generated by concatenating the read ID__1 and CSI in the stated order, to obtain a content key. Unit 117 outputs the obtained content key to encryption unit 110. Here, decryption algorithm D is an algorithm for conducting the reverse processing of encryption algorithm E.

(8) Control Unit 101, Input Unit 113, Display Unit 114

Input unit 113 receives inputs from a user, and outputs the received inputs to control unit 101.

At a time of starting processing, control unit 101, on receipt of an IC card ID from connected IC card 400, confirms whether the received ID matches the IC card ID in the registration information. If not matched, control unit 101 displays on display unit 114 the fact that the connected IC card is not the IC card affiliated with AD server 100, and ends the processing. If matched, control unit 101 continues the processing as follows.

Registration of Playback Apparatus 200

On receipt of a registration request from playback apparatus 200 via IO unit 115, control unit 101 controls public-key-encryption processing unit 105, and establishes a SAC using a CSI initial value "0", by the SAC establishment method to be described later (here, the CSI initial value "0" used at a time of registration indicates that playback apparatus 200 has yet to be registered). From the result of the device authentication at a time of establishing the SAC, control unit 101 judges whether the target device has an authorized public key pair and whether the target device is unregistered. If the target device has the authorized public key pair and CSI having a "0" value, authentication is judged to be successful. If the target device does not hold CSI having a "0" value, control unit 101 judges the target device to already be registered in another authorized domain. Moreover, whether or not the authorized domain in which the target device is registered is the authorized domain managed by AD server 100 may be judged by confirming whether the CSI of the target device matches the CSI stored in CSI storage unit 108.

When judged that the target device is unregistered, control unit 101 reads registration information from registration-information storage unit 106, and judges whether the remaining number of devices is "0". If the remaining number is not "0", control unit 101 judges whether the registered number is "0". If the registered number is "0", control unit 101 controls CSI generation unit 107 to generate CSI, and stores the generated CSI in CSI storage unit 108. If the registered number is not "0", control unit 101 reads CSI from CSI storage unit 108, has the generated or read CSI encrypted by encryption unit 110 to generate encrypted CSI, and outputs the encrypted CSI to playback apparatus 200 via IO unit 115. On receipt from playback apparatus 200 of a receipt notification showing that the outputted CSI has been received, control unit 101 adds "1" to the registered number in the registration information, subtracts "1" from the remaining number, and ends the processing.

If authentication is unsuccessful, or if the target device is registered, or if the remaining number is "0", control unit 101 transmits a registration failure notification to playback apparatus 200 showing that registration is not possible, and ends the processing.

Also, at a time of CSI being generated by CSI generation unit 107, control unit 101 establishes a SAC with IC card 400 and shares session key SK, performs encryption algorithm E on the generated CSI using session key SK to generate encrypted CSI, and transmits the encrypted CSI to IC card 400.

Registration of On-Vehicle 300

(a) On receipt of an input from input unit 113 showing the copying of CSI when IC card 400, whose ID has already been confirmed, is connected, control unit 101 judges whether the remaining number is "0", and if not "0", transmits a permission right to IC card 400 showing that a once-only copy of CSI is permitted. Control unit 101, on receipt from IC card 400 of a receipt notification, ends the processing.

When the remaining number is "0", control unit 101 displays the fact that copying is not possible on display unit 114, and ends the processing.

(b) When IC card 400 is connected to AD server 100, AD server 100 confirms that the IC card ID has been registered in the registration information, and on receipt of a copy notification showing that CSI has been copied, control unit 101 extracts the ID of the CSI copy target (i.e. on-vehicle device 300), which is included in the copy notification, and stores the extracted ID as a device ID in the registration information. Also, control unit 101 transmits a receipt notification to IC card 400 showing that the copy target ID has been received.

Moreover, although the above description relates here to CSI having been generated, when CSI has not being generated, CSI is generated and transmitted to IC card 400 in the same manner as when playback apparatus 200 is registered.

Content Delivery

On receipt of a content delivery request from playback apparatus 200 via IO unit 115, control unit controls public-key-encryption processing unit 105 to establish a SAC using the SAC establishment method to be described later, and shares session key SK. Since CSI stored in CSI storage unit 108 is used in authentication conducted at the time of establishing the SAC, when authentication is successful, control unit 101 judges that the target device is registered because of the target device holding CSI generated in AD server 100, and when authentication is unsuccessful, control unit 101 judges that the target device is not registered in AD server 100.

When authentication is unsuccessful, control unit 101 transmits a delivery failure notification to playback apparatus 200 showing that distribution of contents is not possible.

When authentication is successful, control unit 101 controls decryption unit 117 to decrypt encrypted content key a stored in content-key storage unit 118 to obtain a content key. Next, control unit 101 controls encryption unit 110 to encrypt the content key using session key SK to generate an encrypted content key s, and transmits encrypted content key s to playback apparatus 200. Also, control unit 101 reads an encrypted content from content storage unit 109, and transmits the encrypted content to playback apparatus 200.

Recording of a Content onto DVD

On receipt of an input from input unit 113 indicating to record a content onto DVD 500, control unit 101 controls decryption unit 117 to decrypt encrypted content key a stored in content-key storage unit 118 to obtain a content key. Next, control unit 101 controls encryption unit 110 to encrypt the content key using encryption key b and encryption key c generated respectively using ID_2 and ID_3 registered in the registration information to generate encrypted content key b and encrypted content key c, and writes the encrypted content keys b and c to DVD 500. Also, control unit 101 reads an encrypted content from content storage unit 109 and writes the encrypted content to DVD 500.

Moreover, the content key may be encrypted using an encryption key generated based on an ID unique to DVD 500, or an encryption key generated based on the DVD 500 ID and CSI.

Withdrawal

On receipt from playback apparatus 200 of a withdrawal request that includes ID_2, control unit 101 controls public-key-encryption processing unit 105 to establish a SAC using the SAC establishment method to be described later. At this time, control unit 101 conducts authentication using CSI stored in CSI storage unit 108. From the authentication result at the time of establishing the SAC, control unit 101 judges whether the device that sent the request is registered, and if the target device is unregistered, control unit 101 transmits an unregistered notification to playback apparatus 200 showing playback apparatus 200 to be unregistered, since it is impossible to withdraw in this case.

When playback apparatus 200 is registered, control unit 101 transmits a deletion notification to playback apparatus 200 indicating to delete CSI. On receipt of a deletion-completed notification from playback apparatus 200 showing that deletion of the CSI has been completed, control unit 101 deletes ID_2 from DEVICE ID in the registration information, subtracts "1" from the registered number, and adds "1" to the remaining number.

1.2 Structure of Playback apparatus 200

As shown in FIG. 4, playback apparatus 200 is structured from a control unit 201, a secret-key storage unit 202, a public-key-certificate storage unit 203, a CRL storage unit 204, a public-key-encryption processing unit 205, a CSI storage unit 208, a content storage unit 209, an ID storage unit 211, an input unit 213, an input/output (IO) unit 215, a decryption unit 217, an encryption unit 218, a content-key storage unit 219, a decryption unit 220, and a playback unit 221. A monitor 251 and a speaker 252 are connected to playback unit 221.

Playback apparatus 200 is a computer system the same AD server 100, and a computer program is stored in the RAM or the hard disk unit. Playback apparatus 200 carries out functions as a result of the microprocessor operating in accordance with the computer program.

(1) IO Unit 215

IO unit 215 conducts transmission/reception of data with AD server 100.

(2) Secret-Key Storage Unit 202, Public-Key-Certificate Storage Unit 203, CRL Storage Unit 204, CSI Storage Unit 208, ID Storage Unit 211

CRL storage unit 204 stores the most recent CRL.

ID storage unit 211 stores ID_2, which is the ID unique to playback apparatus 200.

CSI storage unit 208 is a tamper-resistant area, and stores "0" showing playback apparatus 200 to be unregistered. When playback apparatus 200 is registered in AD server 100, CSI storage unit 208 stores CSI acquired from AD server 100.

Public-key-certificate storage unit 203 stores a PKC Cert_2 issued by the CA. PKC Cert_2 includes a public key PK_2 of playback apparatus 200, ID_2 of playback apparatus 200, and signature data Sig_CA2 generated by the CA performing signature algorithm S on public key PK_2 and ID_2.

Secret-key storage unit 202 is a tamper-resistant area, and stores a secret key SK_2 corresponding to public key PK_2 of playback apparatus 200.

(3) Public-Key-Encryption Processing Unit 205

Public-key-encryption processing unit 205 establishes a SAC by the SAC establishment method to be described later, at a time of communicating with AD server 100, and shares session key SK. Unit 205 outputs the shared session key SK to decryption unit 217.

(4) Decryption Unit 217, Decryption Unit 220

Decryption unit 217, at a time of a content being distributed from AD server 100, performs decryption algorithm D on encrypted content key s delivered from AD server 100, using session key SK shared by public-key-encryption processing unit 205, to obtain a content key. Here, decryption algorithm D is an algorithm for conducting the reverse processing of encryption algorithm E.

Also, at a time of playing a content once stored, decryption unit 217 reads ID_2 from ID storage unit 211, reads CSI from CSI storage unit 208, and concatenates the reads ID_2 and CSI in the stated order to generate a decryption key b. Decryption unit 217 performs decryption algorithm D on encrypted content key b read from content-key storage unit 219, using the generated decryption key b, to obtain a content key, and outputs the obtained content key to decryption unit 220.

Decryption unit 220 reads an encrypted content stored in content storage unit 209, performs decryption algorithm D on the encrypted content using the content key received from decryption unit 217 to obtain a content, and outputs the obtained content to playback unit 221.

(5) Encryption Unit 218

Encryption unit 218, at a time of storing a content acquired from AD server 100, reads ID_2 from ID storage unit 211, and reads CSI from CSI storage unit 208. Unit 218 concatenates the read ID_2 and CSI in the stated order to generate encryption key b, and performs encryption algorithm E on the content key received from decryption unit 217 using the generated encryption key b to generate encrypted content key b, and outputs encrypted content key b to content-key storage unit 219.

(6) Content Storage Unit 209, Content-Key Storage Unit 219

Content storage unit 209 stores encrypted contents transmitted from AD server 100.

Content-key storage unit 219 stores encrypted content key b encrypted by encryption unit 218.

(7) Control Unit 201, Input Unit 213

Registration

On receipt by input unit 213 of an input indicating to start the registration processing, control unit 201 reads ID_2 from ID storage unit 211, transmits a registration request that includes ID_2 to AD server 100 via IO unit 215, and establishes a SAC by the SAC establishment method to be described later.

Control unit 201, on receipt from AD server 100 of a registration failure notification, displays the fact that registration is not possible on monitor 251, and ends the registration processing.

Control unit 201, on receipt from AD server 100 of encrypted CSI, controls decryption unit 217 to decrypt the encrypted CSI to obtain CSI, and stores the obtained CSI in CSI storage unit 208. Also, unit 201 transmits a receipt notification to AD server 100 showing that the CSI has been received.

Content Delivery

On receipt by input unit 213 of an input indicating to acquire and playback a content, control unit 201 transmits a delivery request to AD server 100.

Control unit 201, on receipt of a delivery failure notification from AD server 100, displays the fact that delivery is not possible on monitor 251, and ends the processing.

When a received content is to be played, control unit 201, on receipt of encrypted content key s from AD server 100, controls decryption unit 217 to decrypt encrypted content key s to obtain a content key. Also, on receipt of an encrypted content from AD server 100, control unit 201 controls decryption unit 220 to decrypt the encrypted content to obtain a content, and has playback unit 221 play the content.

Playback after Accumulating Contents

On receipt by input unit 213 of an input indicating to acquire and accumulate contents, control unit 201 conducts the same processing as above to acquire contents. Once contents have been acquired, control unit 201 has decryption unit 217 decrypt encrypted content key s received from AD server 100, and controls encryption unit 218 to encrypt the decrypted content key, and stores the encrypted content key in content-key storage unit 219 as encrypted content key b. Also, on receipt of encrypted contents from AD server 100, control unit 201 stores the encrypted contents in content storage unit 209.

On receipt by input unit 213 of an input indicating to playback contents stored in content storage unit 209, control unit 201 controls decryption unit 217 to decrypt encrypted content key b, has decryption unit 220 decrypt the encrypted contents to obtain contents, and has playback unit 221 play the contents.

Withdrawal

On receipt by input unit 213 of an input indicating to start withdrawal processing, control unit 201 establishes a SAC by the SAC establishment method to be described later.

Control unit 201, on receipt of an unregistered notification from AD server 100, displays on monitor 251 the fact that playback apparatus 200 is not registered in AD server 100, and ends the processing.

Control unit 201, on receipt of a deletion notification from AD server 100, deletes CSI stored in CSI storage unit 208, and stores "0" in CSI storage unit 208 showing playback apparatus 200 to be unregistered. Also, control unit 201 transmits a deletion-completed notification that notifies AD server 100 that deletion of the CSI has been completed.

(8) Playback Unit 221

Playback unit 221 generates video signals from contents received from decryption unit 220, and outputs the generated video signals to monitor 251. Also, unit 221 generates audio signals from received contents, and outputs the generated audio signals to speaker 252.

1.4 Structure of On-Vehicle Device 300

Figure 5:
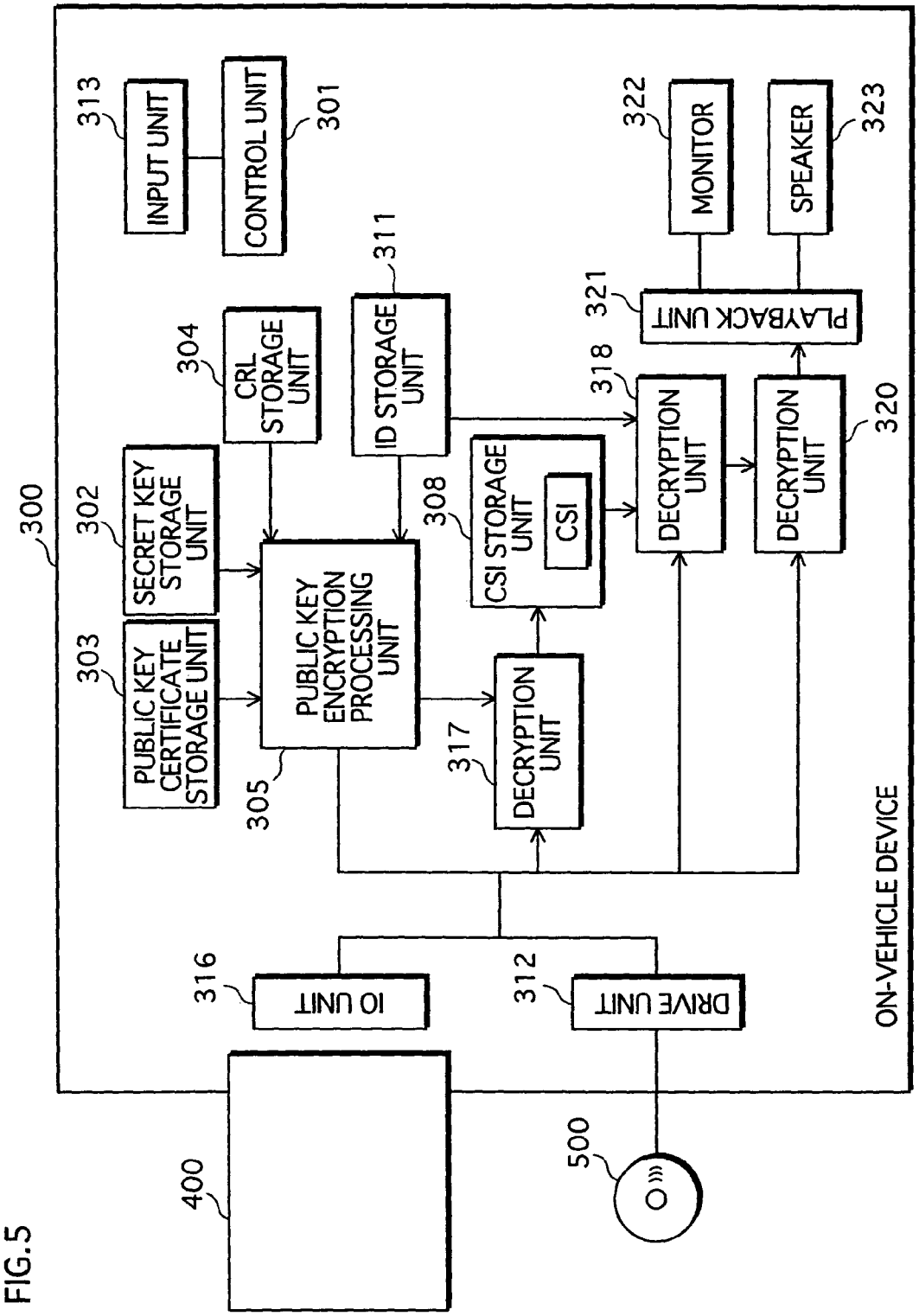
FIG. 5 is a block diagram showing a structure of an on-vehicle device 300.

As shown in FIG. 5, on-vehicle device 300 is structured from a control unit 301, a secret-key storage unit 302, a public-key-certificate storage unit 303, a CRL storage unit 304, a public-key-encryption processing unit 305, a CSI storage unit 308, an ID storage unit 311, a drive unit 312, an input unit 313, an input/output (IO) unit 316, decryption units 317, 318 and 320, a playback unit 321, a monitor 322 and a speaker 323.

On-vehicle device 300 is a computer system the same AD server 100, and a computer program is stored on the RAM or the hard disk unit. On-vehicle device 300 carries out functions as a result of the microprocessor operating in accordance with the computer program.

(1) Drive Unit 312, IO Unit 316

Drive Unit 312 reads encrypted content key c from DVD 500, and outputs encrypted content key c to decryption unit 318. Also, unit 312 reads an encrypted content and outputs the encrypted content to decryption unit 320.

IO unit 316 conducts transmission/reception of data with IC card 400, under the control of control unit 301.

(2) Secret-Key Storage Unit 302, Public-Key-Certificate Storage Unit 303, CRL Storage Unit 304, CSI Storage Unit 308, ID Storage Unit 311

CRL storage unit 304 stores the most recent CRL.

ID storage unit 311 stores ID_3, which is the ID unique to on-vehicle device 300.

CSI storage unit 308 is a tamper-resistant area, and stores "0" showing on-vehicle device 300 to be unregistered. On receipt from IC card 400 of CSI generated by AD server 100, unit 308 stores the received CSI.

Public-key-certificate storage unit 303 stores a PKC Cert_3 issued by the CA. PKC Cert_3 includes a public key PK_3 and ID_3 of on-vehicle device 300, and signature data Sig_CA3 generated by the CA performing signature algorithm S on public key PK_3 and ID_3.

Secret-key storage unit 302 is a tamper-resistant area, and stores a secret key SK 3 corresponding to public key PK_3.

(3) Public-Key-Encryption Processing Unit 305

Public-key-encryption processing unit 305 conducts authentication with IC card 400, under the control of control unit 301, and establishes a SAC by the SAC establishment method to be described later. Also, unit 305 outputs session key SK shared at this time to decryption unit 317.

(4) Decryption Units 317, 318, 320

Decryption unit 317, on receipt of encrypted CSI from IC card 400 and under the control of control unit 301, performs decryption algorithm D on the encrypted CSI using session key SK received from public-key-encryption processing unit 305 to obtain CSI, and outputs the obtained CSI to CSI storage unit 308.

At a time of playing a content, decryption unit 318, on receipt of encrypted content key c from drive unit 312, reads ID_3 from ID storage unit 311 and reads CSI from CSI storage unit 308. Unit 318 concatenates the read ID_3 and CSI in the stated order to generate decryption key c. Unit 318 performs decryption algorithm D on encrypted content key c using decryption key c to obtain a content key, and outputs the obtained content key to decryption unit 320.

Decryption unit 320 receives an encrypted content from drive unit 312 and a content key from decryption unit 318. Unit 320 performs decryption algorithm D on the encrypted content using the received content key to obtain a content, and outputs the obtained content to playback unit 321.

(5) Control Unit 301, Input Unit 313

Control unit 301, when IC card 400 is connected to on-vehicle device 300, controls public-key-encryption processing unit 305 to establish a SAC. At this time, unit 301 uses the "0" stored in CSI storage unit 308 as CSI. If device authentication is unsuccessful, unit 301 ends the processing. Also, when a registered notification is received from IC card 400, unit 301 displays the fact that on-vehicle device 300 is registered on monitor 322, and ends the processing. Unit 301, on receipt of encrypted CSI from IC card 400 via IO unit 316, controls decryption unit 317 to decrypt the encrypted CSI to obtain CSI, and stores the obtained CSI in CSI storage unit 308. Also, unit 301 transmits a receipt notification to IC card 400 showing that the CSI has been received.

Moreover, copying of CSI from on-vehicle device 300 to other devices is not conducted.

Control unit 301, on receipt of an input from input unit 313 indicating to view a content recorded on DVD 500, controls drive unit 312 to read encrypted content key c and an encrypted content from DVD 500. Unit 301 has encrypted content key c decrypted by decryption unit 318 to obtain a content key, and has the encrypted content decrypted by decryption unit 320 to obtain a content. Also, unit 301 controls playback unit 321 to play the obtained content.

(6) Playback Unit 321, Monitor 322, Speaker 323

Playback unit 321 generates video signals and audio signals from received contents, outputs the generated video and audio signals to monitor 322 and speaker 323 respectively, and plays the contents.

1.3 Structure of IC Card 400

Figure 6:
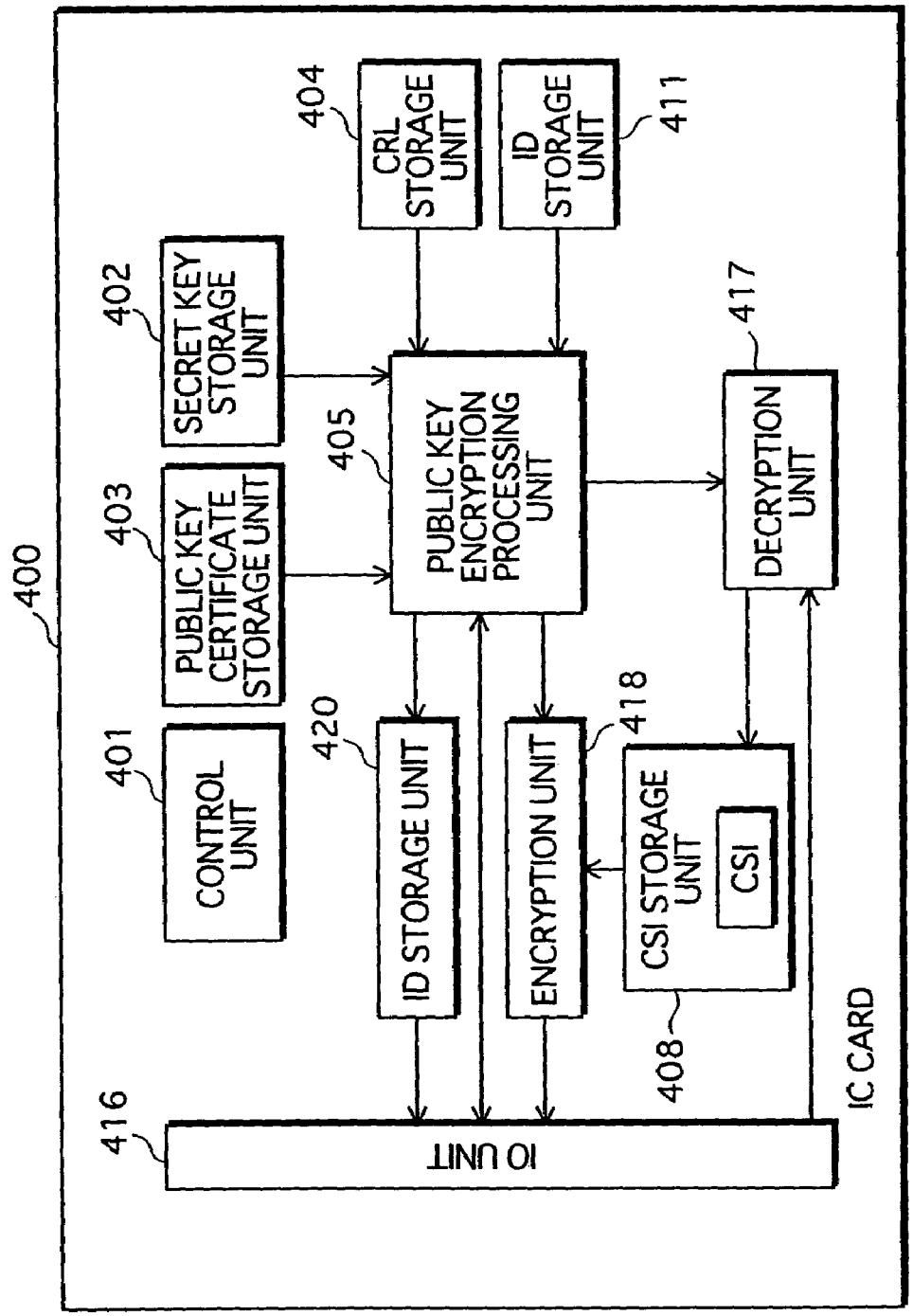
FIG. 6 is a block diagram showing a structure of an IC card 400.

As shown in FIG. 6, IC card 400 is structured from a control unit 401, a secret-key storage unit 402, a public-key-certificate storage unit 403, a CRL storage unit 404, a public-key-encryption processing unit 405, a CSI storage unit 408, an ID storage unit 411, an input/output (IO) unit 416, a decryption unit 417, an encryption unit 418, and an ID storage unit 420.

IC card 400 is connectable to AD server 100 and on-vehicle device 300. IC card 400 is used as a device within the authorized domain at a time of registering devices such as on-vehicle device 300 that are not connectable with AD server 100.

(1) Secret-Key Storage Unit 402, Public-Key-Certificate Storage Unit 403, CRL Storage Unit 404, CSI Storage Unit 408, ID Storage Unit 411, ID Storage Unit 420

CRL storage unit 404 stores the most recent CRL.

ID storage unit 411 stores an ID_4, which is an ID unique to IC card 400.

CSI storage unit 408 is a tamper-resistant area, and when a client device has not been registered in AD server 100, stores "0" showing that a client device has yet to be registered. When CSI is generated by AD server 100, unit 408 stores CSI obtained from AD server 100 in correspondence with "0", which is the copy frequency. Here, the copy frequency is the number of times that copying of CSI to other client devices is permitted.

Public-key-certificate storage unit 403 stores a PKC Cert_4 issued by the CA. PKC Cert_4 includes a public key PK_4 and ID_4 of IC card 400, and signature data Sig_CA4 generated by the CA performing signature algorithm S on public key PK_4 and ID_4.

Secret-key storage unit 402 is a tamper-resistant area, and stores a secret key SK_4 corresponding to public key PK_4.

ID storage unit 420 is an area storing the ID of a CSI copy target.

(2) Public-Key-Encryption Processing Unit 405

Public-key-encryption processing unit 405, under the control of control unit 401, establishes a SAC with AD server 100, shares session key SK, and outputs the shared session key SK to decryption unit 417.

Also, unit 405 establishes a SAC with on-vehicle device 300 and shares session key SK, and outputs the shared session key SK to encryption unit 418.

(3) Decryption Unit 417

Decryption unit 417, on receipt of encrypted CSI via IO unit 416 and under the control of control unit 401, performs decryption algorithm D on the encrypted CSI using session key SK received from public-key-encryption processing unit 405 to obtain CSI, and stores the obtained CSI in CSI storage unit 408.

(4) Encryption Unit 418

Encryption unit 418, under the control of control unit 401, reads CSI from CSI storage unit 408, receives session key SK from public-key-encryption processing unit 405, performs encryption algorithm E on the CSI using session key SK to generate encrypted CSI, and transmits the encrypted CSI to on-vehicle device 300.

(5) Control Unit 401, IO Unit 416

When IC card 400 is connected to AD server 100, control unit 401 reads ID_4 from ID storage unit 411, and transmits the read ID_4 to AD server 100.

At a time of receiving CSI from AD server 100, control unit 401 controls public-key-encryption processing unit 405 to establish a SAC with AD server 100 and share session key SK, and on receipt of encrypted CSI, unit 401 has the encrypted CSI decrypted by decryption unit 417 to obtain CSI, and stores the obtained CSI in CSI storage unit 408.

At a time of registering on-vehicle device 300, control unit 401, on receipt of a permission right from AD server 100, adds "1" to the copy frequency stored in correspondence with the CSI, and transmits a receipt notification to AD server 100.

When IC card 400 is connected to on-vehicle device 300, control unit 401 controls public-key-encryption processing unit 405 to establish a SAC, and shares session key SK. At this time, unit 401 conducts authentication using the initial value "0" as CSI, and from the authentication result, judges whether on-vehicle device 300 is unregistered. If authentication is unsuccessful, unit 401 judges on-vehicle device 300 to be registered, transmits a registered notification to on-vehicle device 300, and ends the processing. When authentication is successful, unit 401 judges on-vehicle device 300 to be unregistered, and stores ID_3 of on-vehicle device 300 received at the time of authentication in ID storage unit 420. Unit 401 reads CSI stored in CSI storage unit 408, has the read CSI encrypted by encryption unit 418 to generate encrypted CSI, and transmits the encrypted CSI to on-vehicle device 300. Unit 401, on receipt of a receipt notification from on-vehicle device 300, subtracts "1" from the copy frequency and ends the processing. Control unit 401, when IC unit 400 is connected to AD server 100, reads ID_4 from ID storage unit 411, and transmits the read ID_4 to AD server 100. Also, unit 401 reads the ID of the CSI copy target from ID storage unit 420, and sends a copy notification that includes the read ID to AD server 100. On receipt from AD server 100 of a receipt notification, unit 401 ends the processing.

2. Operations of Group Formation/Management System 1

2.1 SAC Operations

Figure 7:
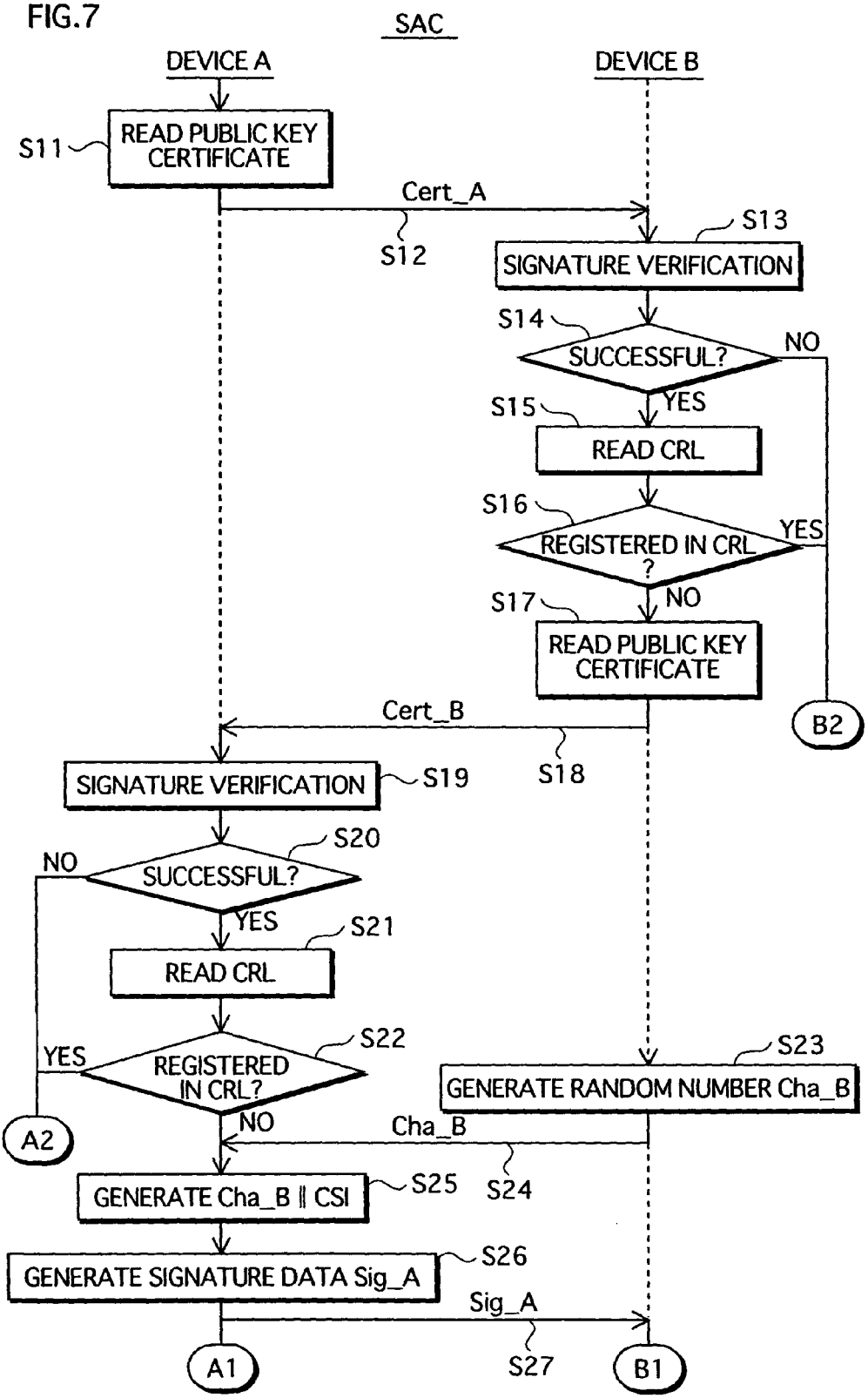
FIG. 7 is a flowchart showing SAC establishment processing (cont.
Figure 8:
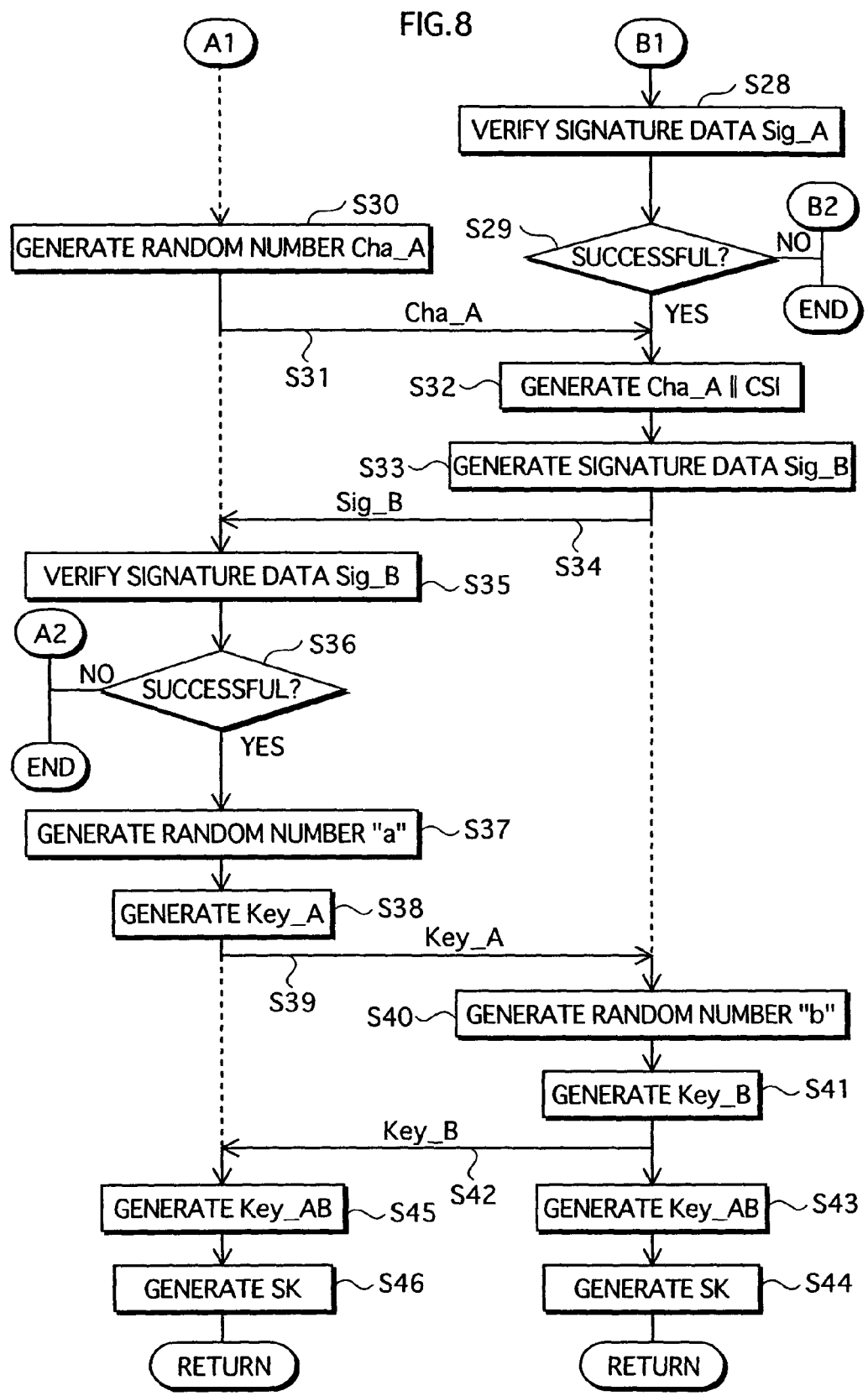
in FIG. 8)

Operations at a time of establishing a SAC will be described using FIGS. 7 and 8.

Moreover, since this SAC establishment method is used in the mutual authentication of any of AD server 100, playback apparatus 200, on-vehicle device 300, and IC card 400, the devices conducting authentication here are referred to simply as device A and device B. Also, although CSI used in authentication can be "0" showing unregistered or values generated by AD server 100, here it is described simply as "CSI".

Here, Gen( ) is a key generation function and Y is a system-unique parameter. Also, key generation function Gen( ) is a function that satisfies a relation Gen(x,Gen(Y,z))=Gen(Y, Gen(x,z)). Moreover, since key generation functions are realizable by arbitrary known technology, the details of such functions will not be referred to here. As one example, a Diffie-Hellman (DH) public key delivery method is disclosed in Nobuichi IKENO, Kenji KOYAMA, *Modern Cryptosystems*, IEICE.

Device A reads PKC Cert_A (step S11), and transmits the read PKC Cert_A to device B (step S12).

Device B, having receiving PKC Cert_A, conducts signature verification by performing a signature verification algorithm V on signature data Sig_CA included in the PKC Cert_A, using a public key PK_CA of the CA (step S13). If verification is unsuccessful (step S14=NO), device B ends the processing. If verification is successful (step S14=YES), device B reads a CRL (step S15), and judges whether ID_A included in the received PKC Cert_A is registered in the CRL (step S16). If judged to be registered (step S16=YES), device B ends the processing. If judged to be not registered (step S16=NO), device B reads PKC Cert_B of device B (step S17), and transmits the read PKC Cert_B to device A (step S18).

Device A, on receipt of PKC Cert_B, conducts signature verification by performing signature verification algorithm V on signature data Sig_CA included in the PKC Cert_B, using public key PK_CA (step S19). If verification is unsuccessful (step S20=NO), device A ends the processing. If verification is successful (step S20=YES), device A reads a CRL (step S21), and judges whether ID_B included in the received PKC Cert_B is registered in the CRL (step S22). If judged to be registered (step S22=YES), device A ends the processing. If judged to be not registered (step S22=NO), device A continues the processing.

Device B generates a random number Cha_B (step S23), and transmits generated random number Cha_B to device A (step S24).

Device A, on receipt of random number Cha_B, concatenates Cha_B and CSI in the stated order to generate Cha_B∥CSI (step S25), performs signature algorithm S on the generated Cha_B∥CSI using a secret key SK_A of device A to generate signature data Sig_A (step S26), and transmits the generated signature data Sig_A to device B (step S27).

Device B, on receipt of signature data Sig_A, conducts signature verification by performing signature verification algorithm V on the received signature data Sig_A using PK_A included in Cert_A received at step S12 (step S28), and if verification is unsuccessful (step S29=NO), device B ends the processing, and if successful (step S29=YES), device B continues the processing.

Device A generates a random number Cha_A (step S30), and transmits generated random number Cha_A to device B (step S31).

Device B, concatenates the received Cha_A and CSI in the stated order to generate Cha_A∥CSI (step S32), performs signature algorithm S on the generated Cha_A∥CSI using a secret key SK_B of device B to generate signature data Sig_B (step S33), and transmits the generated signature data Sig_B to device A (step S34).

Device A, on receipt of signature data Sig_B, conducts signature verification by performing signature verification algorithm V on signature data Sig_B using PK_B included in Cert_B received at step S18 (step S35), and if verification is unsuccessful (step S36=NO), device A ends the processing. If successful (step S36=YES), device A generates a random number "a" (step S37), generates Key_A=Gen(a,Y) using generated random number "a" (step S38), and transmits the generated Key_A to device B (step S39).

Device B, on receipt of Key_A, generates a random number "b" (step S40), and generates Key_B=Gen(b,Y) using generated random number "b" (step S41). Device B transmits the generated Key_B to device A (step S42). Also, device B generates Key_AB=Gen(b,Key_A)=Gen(b,Gen(a,Y)) using generated random number "b" and the received Key_A (step S43), and generates session key SK=Gen(CSI,Key_AB) using Key_AB and the CSI (step S44).

Device A, on receipt of Key_B, generates Key_AB=Gen (a,Key_B)=Gen (a,Gen (b,Y)) using generated random number "a" and the received Key_B (step S45), and generates session key SK=Gen (CSI,Key_AB) using the generated Key_AB and the CSI (step S46).

2.2 Operations for Playback Apparatus 200 Registration

Figure 9:
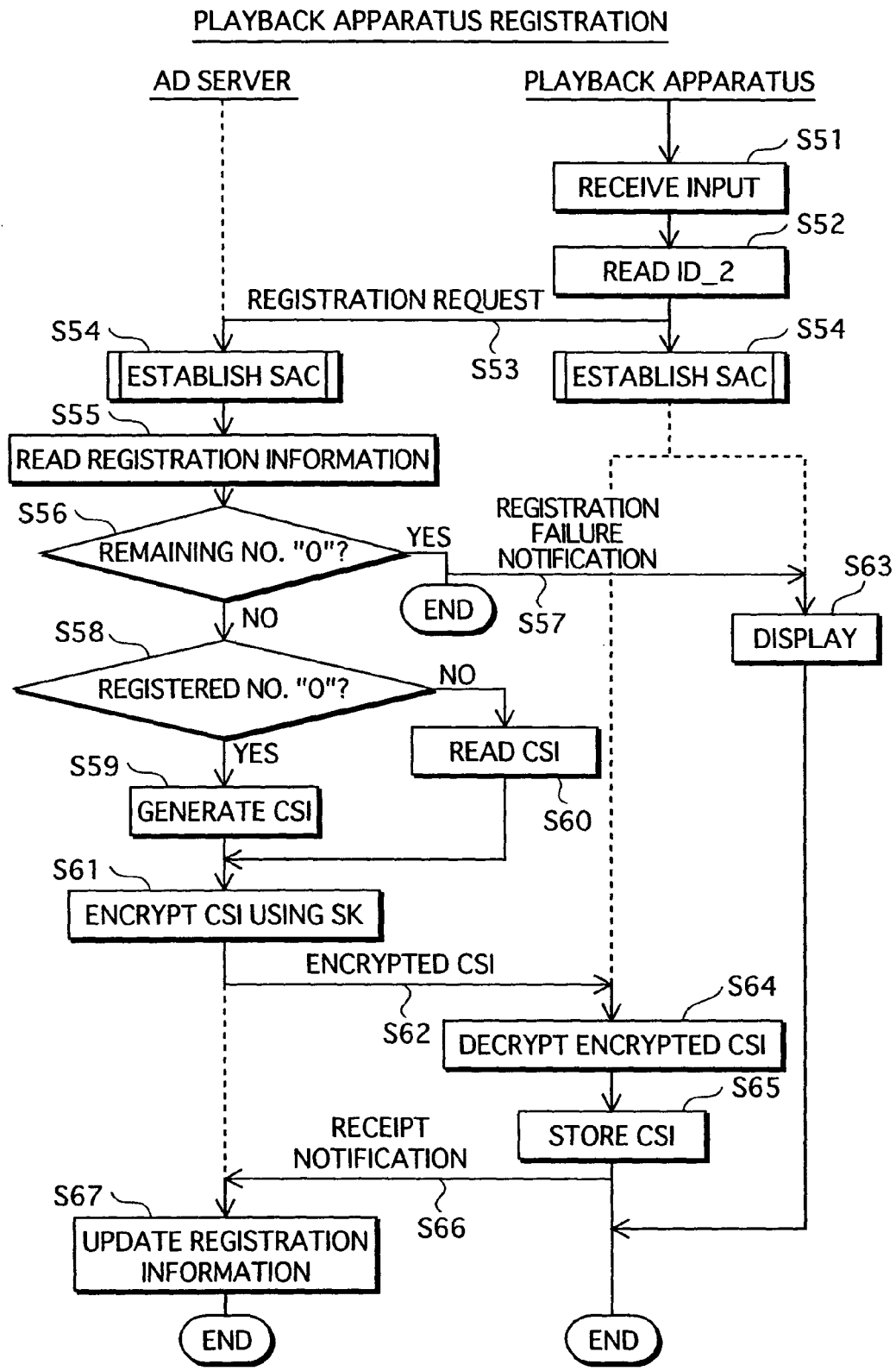
FIG. 9 is a flowchart showing operations by which AD server 100 registers playback apparatus 200.

Operations at a time of AD server 100 registering playback apparatus 200 will now be described using FIG. 9.

Moreover, AD server 100 has IC card 400 connected thereto, and has already confirmed that IC card 400 is an IC card affiliated with AD server 100.

Playback apparatus 200, on receipt of an input from input unit 213 indicating to start the registration processing (step S51), reads ID_2 from ID storage unit 211 (step S52), and transmits a registration request that includes ID_2 to AD server 100 (step S53).

Given that AD server 100 is device A and playback apparatus 200 is device B, a SAC is established by the above-described method (step S54). At this time, AD server 100 uses "0" as CSI and playback apparatus 200 uses CSI stored in CSI storage unit 208.

AD server 100 conducts the signature verification at step S35 using "0" as CSI, and thus judges playback apparatus 200 to be unregistered if verification is successful, and to be registered if verification is unsuccessful. If playback apparatus 200 is judged to be unregistered, AD server 100 reads registration information (step S55), and judges whether the remaining number is "0" (step S56). If "0" (step S56=YES), AD server 100 transmits a registration failure notification to playback apparatus 200 (step S57). If the remaining number is not "0" (step S56=NO), AD server 100 judges whether the registered number is "0" (step S58). If "0" (step S58=YES), CSI is generated by CSI generation unit 107 (step S59). If the registered number is not "0" (step S58=NO), AD server 100 reads CSI from CSI storage unit 108 (step S60). Encryption algorithm E is performed on the generated or read CSI by encryption unit 119 using session key SK, to generate encrypted CSI (step S61), and AD server 100 transmits the encrypted CSI to playback apparatus 200 (step S62).

Playback apparatus 200, if a registration failure notification is received, displays the fact that registration is not possible on monitor 251 (step S63), and ends the processing. If encrypted CSI is received, the encrypted CSI is decrypted by decryption unit 217 to obtain CSI (step S64), and playback apparatus 200 stores the CSI in CSI storage unit 208 (step S65). Also, playback apparatus 200 transmits a receipt notification to AD server 100 (step S66)

On receipt of the receipt notification from playback apparatus 200, AD server 100 writes ID_2 into DEVICE ID in the registration information, adds "1" to the registered number, and subtracts "1" from the remaining number (step S67).

Figure 10:
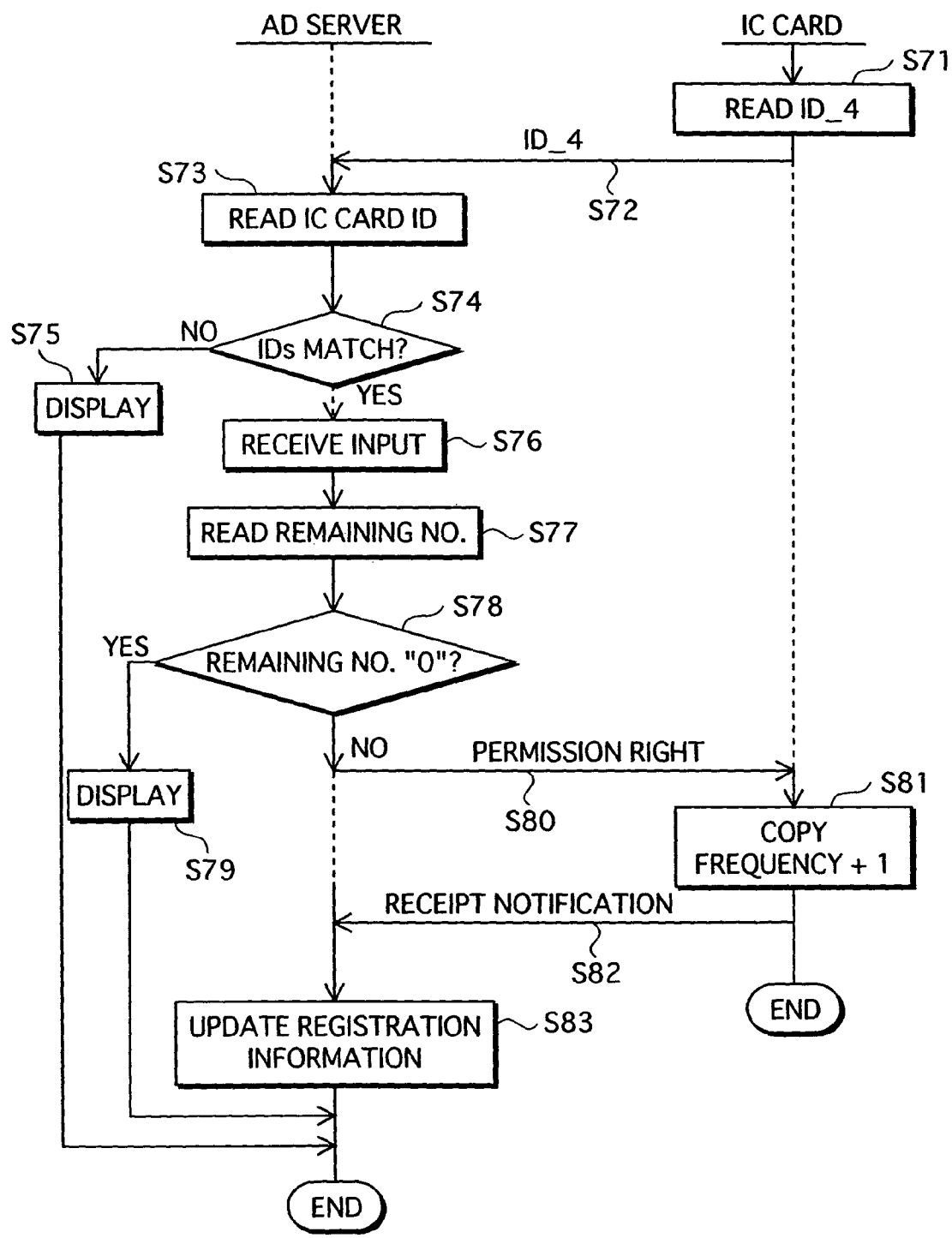
FIG. 10 is a flowchart showing operations by which AD server 100 registers on-vehicle device 300.

2.3 Operations for On-Vehicle Device 300 Registration (1) Operations at a time of permitting the copying of CSI from AD server 100 to IC card 400 will now be described using FIG. 10.

When IC card 400 is connected to AD server 100, IC card 400 reads ID_4 from ID storage unit 411 (step S71), and transmits the read ID_4 to AD server 100 (step S72).

AD server 100, on receipt of ID_4, reads an IC card ID from the registration information (step S73), and judges whether the received ID matches the read ID (step S74). If not matched (step S74=NO), AD server 100 displays on display unit 114 the fact that the connected IC card is not an IC card affiliated with AD server 100 (step S75) and ends the processing. If matched (step S74=YES), AD server 100 continues the processing. In this way, AD server 100 confirms whether the connected IC card is an affiliated IC card, and stands by until an input is received once confirmation is completed.

On receipt by input unit 113 of an input indicating to permit a copying of CSI to IC card 400 (step S76), control unit 101 reads the remaining number from registration-information storage unit 106 (step S77), judges whether the remaining number is "0" (step S78), and if "0" (step S78=YES), displays on display unit 114 the fact that registration is not possible (step S79). If the remaining number is not "0" (step S78=NO), control unit 101 transmits a permission right to IC card 400 permitting a once-only copying of CSI (step S80).

IC card 400, on receipt of the permission right from AD server 100, adds "1" to the copy frequency (step S81), and transmits a receipt notification to AD server 100 (step S82).

AD server 100, on receipt of the receipt notification, adds "1" to the registered number in the registration information, subtracts "1" from the remaining number (step S83), and ends the processing.

Figure 11:
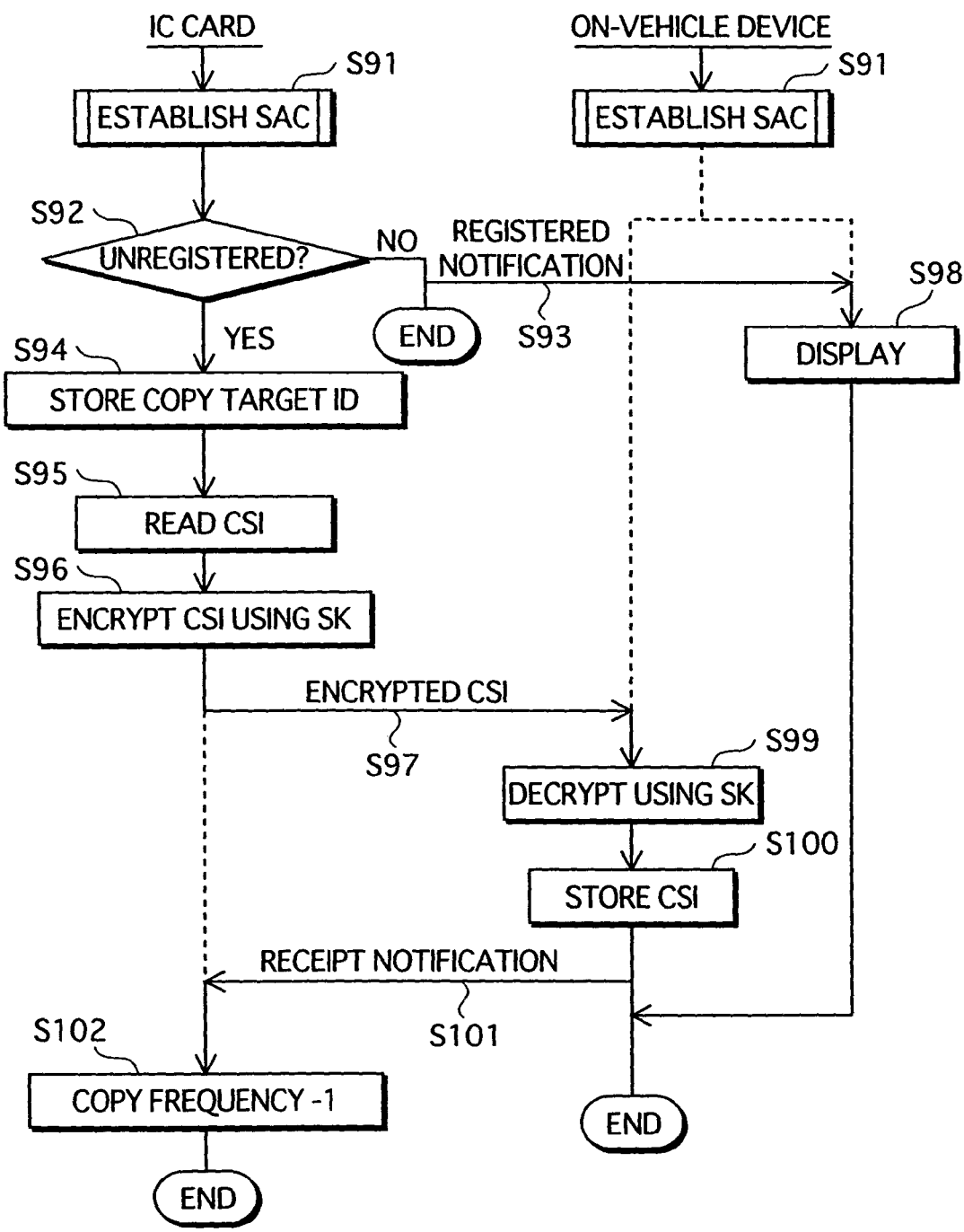
FIG. 11 is a flowchart showing operations by which AD server 100 registers on-vehicle device 300.

(2) Operations at a time of copying CSI from IC card 400 to on-vehicle 300 will now be described using FIG. 11.

When IC card 400 is connected to on-vehicle device 300, the steps S71 to S75 processing is conducted, and IC card 400 is ascertained. Also, IC card 400 and on-vehicle device 300 conducts SAC establishment processing as device A and device B, respectively, and share session key SK (step S91). At this time, IC card 400 conducts authentication using "0", which is the initial value of CSI, and on-vehicle device 300 conducts authentication using a value stored in CSI storage unit 308.

Control unit 401 in IC card 400 conducts the signature verification at step S35 using "0" as CSI, and thus judges on-vehicle device 300 to be unregistered if verification is successful, and to be registered if verification is unsuccessful. If judged to be registered (step S92=NO), IC card 400 transmits a registration failure notification to on-vehicle device 300 (step S93), and ends the processing. If judged to be unregistered (step S92=YES), IC card 400 stores ID_3 of on-vehicle device 300 received at step S18 in ID storage unit 420 (step S94). Encryption unit 418, on receipt of session key SK from public-key-encryption processing unit 405, reads CSI from CSI storage unit 408 (step S95). Encryption unit 418 encrypts the CSI using session key SK to generate encrypted CSI (step S96), and transmits the encrypted CSI to on-vehicle device 300 via IO unit 416 (step S97).

Control unit 301 in on-vehicle device 300, if a registration failure notification is received from IC card 400, displays the fact that registration is not possible on monitor 322 (step S98), and ends the processing. If encrypted CSI is received from IC card 400, decryption unit 317 receives session key SK from public-key-encryption processing unit 305, and decrypts the encrypted CSI using session key SK to obtain CSI (step S99), and stores the obtained CSI in CSI storage unit 308 (step S100). Also, control unit 301 transmits a receipt notification to IC card 400 (step S101).

IC card 400, on receipt of the receipt notification from on-vehicle device 300, subtracts "1" from the copy frequency (step S102) and ends the processing.

(3) Operations at a time of notifying AD server 100 of the copying of CSI will now be described.

When IC card 400 is connected to AD server 100, AD server 100 confirms the ID of IC card 400 to confirm that IC card 400 is an affiliated IC card, and stands by until an input is received once confirmation is completed.

IC card 400 reads ID_3, which is the ID of the copy target, from ID storage unit 420, and transmits a copy notification that includes ID_3 to AD server 100.

AD server 100, on receipt of the copy notification, stores ID_3 included in the copy notification in the registration information as a device ID. Also, AD server 100 transmits a receipt notification to IC card 400 and ends the processing.

IC card 400, on receipt of the receipt notification from AD server 100, ends the processing.

2.4 Content Delivery Operation 1

Figure 12:
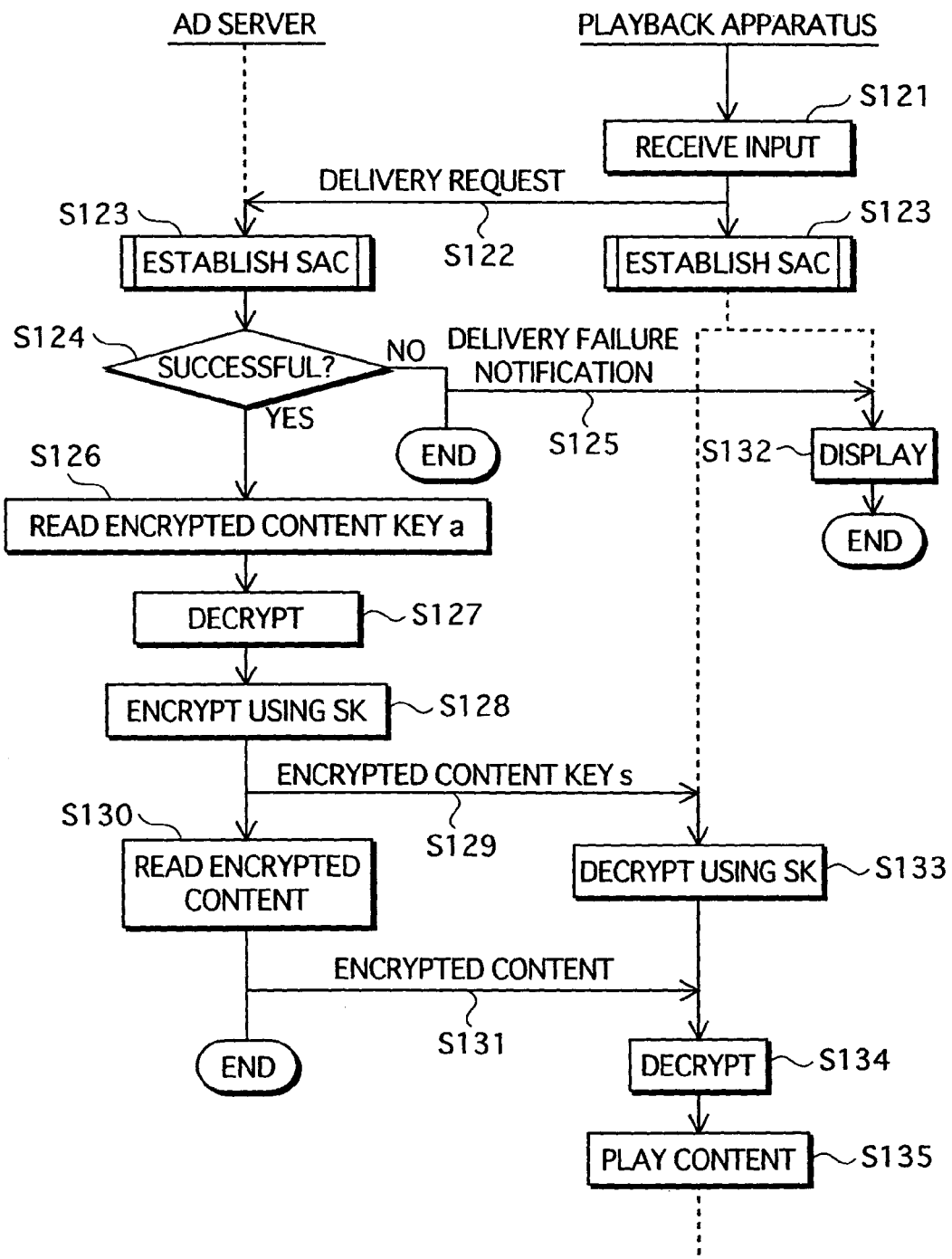
FIG. 12 is a flowchart showing operations to deliver a content.

Operations at a time of delivering a content from AD server 100 to playback apparatus 200 and playing the delivered content will now be described using FIG. 12.

Playback apparatus 200, on receipt of an input indicating to acquire a content from input unit 213 (step S121), transmits a delivery request for a content to AD server 100 (step S122).

AD server 100 and playback apparatus 200 establish a SAC (step S123). At this time, server 100 and device 200 conduct authentication using CSI stored in respective CSI storage units.

AD server 100 confirms that playback apparatus 200 is within the same authorized domain by the processing at step S35.

If authentication is unsuccessful (step S124=NO), AD server 100 transmits a delivery failure notification to playback apparatus 200 (step S125) and ends the processing. If authentication is successful (step S124=YES), AD server 100 reads encrypted content key a from content-key storage unit 118 (step S126), encrypted content key a is decrypted by decryption unit 117 (step S127), and furthermore, the content key is encrypted in encryption unit 110 using session key SK shared at a time of authentication, to generate encrypted content key s (step S128), and AD server 100 transmits encrypted content key s to playback apparatus 200 (step S129). Also, AD server 100 reads an encrypted content from content storage unit 109 (step S130), and transmits the encrypted content to playback apparatus 200 (step S131).

Playback apparatus 200, in the case of a delivery failure notification being received, displays the fact that delivery is not possible on monitor 251 (step S132) and ends the processing. In the case of encrypted content key s being received, encrypted content key s is decrypted in decryption unit 217 using session key SK to obtain a content key (step S133), and the obtained content key is outputted to decryption unit 220. Decryption unit 220 performs decryption algorithm D on the encrypted content received from AD server 100, using the content key received from decryption unit 217, to obtain a content (step S134), and outputs the obtained content to playback unit 221. Playback unit 221 generates video and audio signals from the received content and outputs the generated video and audio signals respectively to monitor 251 and speaker 252, and plays the content (step S135).

2.5 Content Delivery Operation 2

Figure 13:
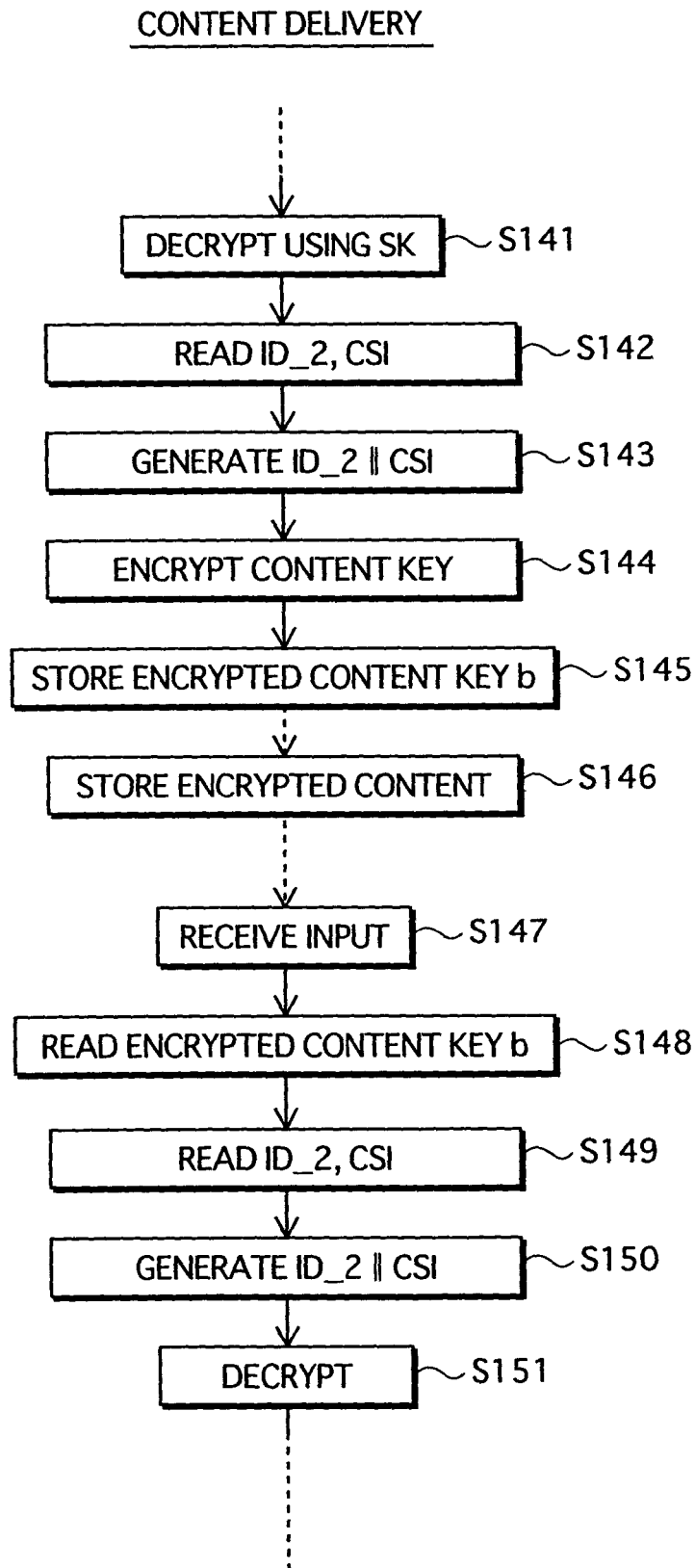
FIG. 13 is a flowchart showing part of the operations to deliver a content.

Operations at a time of playing contents received from AD server 100 once they have been accumulated will now be described using FIG. 13.

The same processing as in steps S121 to S130 is conducted.

Decryption unit 217 decrypts encrypted content key s to obtain a content key (step S141), and outputs the obtained content key to encryption unit 218. Encryption unit 218 reads CSI from CSI storage unit 208 and ID_2 from ID storage unit 211 (step S142). Encryption unit 218 concatenates the read ID_2 and CSI in the stated order to generate ID_2∥CSI (step S143), and sets ID_2∥CSI as encryption key b. Encryption unit 218 encrypts the content key using the generated encryption key b to generate encrypted content key b (step S144), and stores encrypted content key b in content-key storage unit 219 (step S145). Also, on receipt of an encrypted content from AD server 100, control unit 201 stores the received encrypted content in content storage unit 209 (step S146).

On receipt from input unit 213 of an input indicating to play a stored content, decryption unit 217 reads encrypted content key b from content-key storage unit 219 (step S148). Also, decryption unit 217 reads CSI from CSI storage unit 208 and ID_2 from ID storage unit 211 (step 149), concatenates the read ID_2 and CSI to generate ID_2∥CSI (step S150), and sets ID_2∥CSI as a decryption key. Decryption unit 217 performs decryption algorithm D on encrypted content key b using the generated decryption key to obtain a content key (step S151), and outputs the obtained content key to decryption unit 220. Decryption unit 220 and playback unit 221 conduct the steps S133 to S135 processing to play the content.

2.6 Operations at a Time of Recording onto DVD

Figure 14:
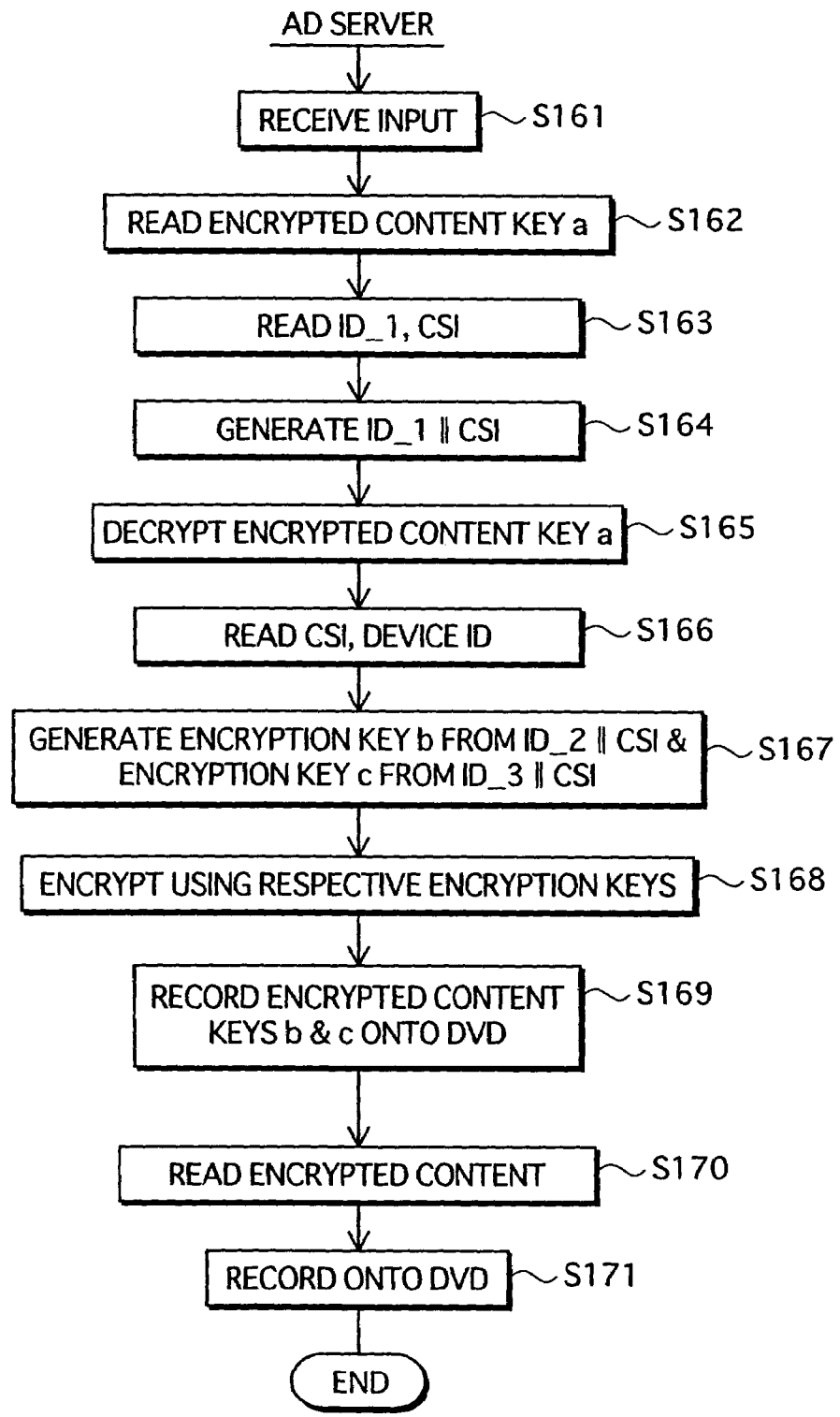
FIG. 14 is a flowchart showing operations to record a content onto a DVD.

Operation at a time of a content being written to DVD 500 by AD server 100 will now be described using FIG. 14.

AD server 100, on receipt from input unit 113 of an input instructing to record a content onto a DVD (step S161), reads encrypted content key a from content-key storage unit 118 (step S162), and reads ID_1 from ID storage unit 111 and CSI from CSI storage unit 108 (step S163). Decryption unit 117 concatenates the read ID_1 and CSI to generate a decryption key (step S164), and decrypts encrypted content key a using the generated decryption key to obtain a content key (step S165), and outputs the obtained content key to encryption unit 110. Encryption unit 110, on receipt of the content key, reads the device IDs from registration-information storage unit 106 and CSI from CSI storage unit 108 (step S166). Encryption unit 110 concatenates the read ID_2 and CSI to generate encryption key b and concatenates the read ID_3 and CSI to generate encryption key c (step S167). Encryption unit 110 encrypts the content key respectively using generated encryption keys b and c to generate encrypted content keys b and c (step S168). Control unit 101 writes encrypted content keys b and c to DVD 500 (step S169). Also, control unit 101 reads an encrypted content from content storage unit 109 (step S170), and writes the encrypted content to DVD 500 (step S171).

2.7 Operations for Playback Apparatus 200 Withdrawal

Figure 15:
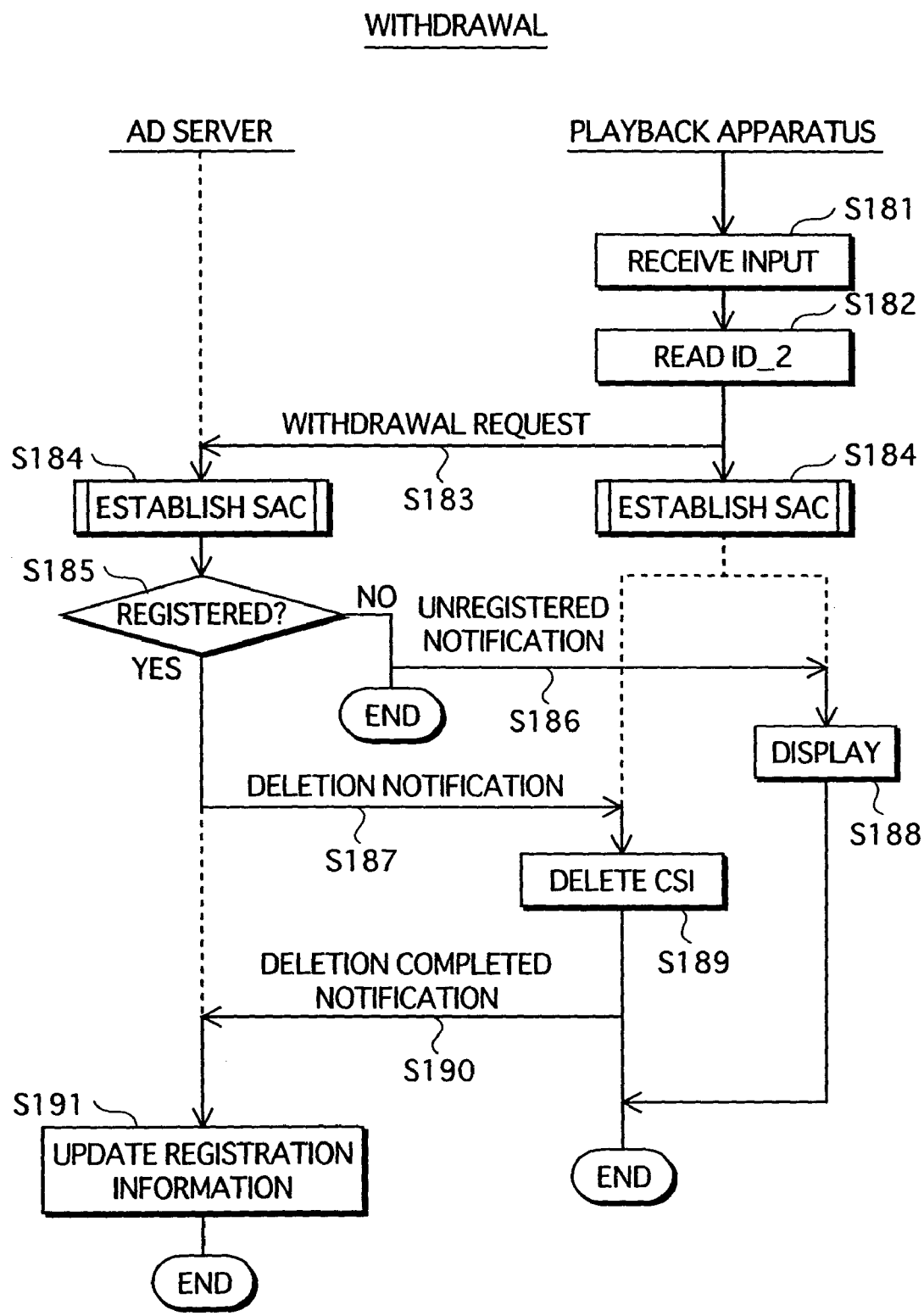
FIG. 15 is a flowchart showing operations to withdraw from AD server 100.

Operations at a time of playback apparatus 200 withdrawing from AD server 100 will now be described using FIG. 15.

Moreover, AD server 100 has IC card 400 connected thereto, and has already confirmed IC card 400.

Playback apparatus 200, on receipt from input unit 213 of an input indicating the withdrawal of playback apparatus 200 (step S181), reads ID_2 from ID storage unit 211 (step S182), and transmits a withdrawal request that includes ID_2 to AD server 100 (step S183).

AD server 100 and playback apparatus 200 conduct authentication and establish a SAC (step S184). At this time, authentication is conducted using CSI stored in respective CSI storage units.

AD server 100 judges whether playback apparatus 200 is registered as a device in the authorized domain of AD server 100 by the step S35 processing, and if unregistered (step S185=NO), transmits an unregistered notification to playback apparatus 200 (step S186). If registered (step S185 YES), AD server 100 transmits a CSI deletion notification to playback apparatus 200 (step S187).

Playback apparatus 200, on receipt of an unregistered notification, displays the fact that playback apparatus 200 is unregistered on monitor 322 (step S188) and ends the processing. On receipt of a deletion notification, playback apparatus 200 deletes CSI from CSI storage unit 208 (step S189). Also, playback apparatus 200 transmits a deletion-completed notification to AD server 100 (step S190).

AD server 100, on receipt of the deletion-completed notification, deletes ID_2 from DEVICE ID in the registration information, subtracts "1" from the registered number, and adds "1" to the remaining number (step S191).

3. Further Variations

While the present invention has been described above based on the above embodiment, the present invention is of course not limited to this embodiment. Variations such as those described below are also included in the present invention.

(1) Although in the above embodiment, CSI is copied using IC card 400 at a time of registering a device not connected to AD server 100, CSI may be transferred from client device to client device directly without using IC card 400.

The transfer of CSI from playback apparatus 200 to a playback apparatus 200n, and the registration of playback apparatus 200n as a device within the authorized domain managed by AD server 100 will now be described as an example.

Playback apparatus 200 and playback apparatus 200n are connected, and playback apparatus 200n is operated to transmit a transfer request to playback apparatus 200. Playback apparatus 200 and playback apparatus 200n establish a SAC and generate session key SK. Playback apparatus 200 encrypts CSI with the session key SK and transmits the encrypted CSI to playback apparatus 200n. Playback apparatus 200n decrypts the encrypted CSI using the session key, stores the CSI, and stores the ID of playback apparatus 200, which is the transfer source, received at a time of establishing the SAC. Also, playback apparatus 200n transmits a receipt notification to playback apparatus 200. Playback apparatus 200, on receipt of the receipt notification, deletes the CSI in CSI storage unit 208 and stores "0" in CSI storage unit 208.

Playback apparatus 200n when connected to AD server 100 and when a SAC is established, notifies AD server 100 of the CSI transfer, transmits the ID of the transfer source and the ID of playback apparatus 200n to AD server 100, and AD server 100 rewrites DEVICE ID in the registration information.

(2) Although in the above embodiment, IC card 400 is affiliated with AD server 100, IC card 400 need not be affiliated.

In this case, as with other client devices, IC card 400 establishes a SAC when connected to AD server 100, registers ID_4 as a device ID, and acquires CSI.

AD server 100, at a time of recording a content key onto DVD 500, encrypts the content key using an encryption key generated by concatenating ID_4 of IC card 400 and CSI.

On-vehicle device 300, when DVD 500 is mounted therein and when IC card 400 is connected, establishes a SAC with IC card 400 and shares session key SK.

IC card 400 concatenates ID_4 and CSI stored in IC card 400 to generate a decryption key, encrypts the decryption key using session key SK to generate an encrypted decryption key, and transmits the encrypted decryption key to on-vehicle device 300.

On-vehicle device 300 decrypts the encrypted decryption key using session key SK to obtain a decryption key, decrypts the encrypted content key read from DVD 500 using the decryption key to obtain a content key, decrypts an encrypted content using the content key to obtain a content, and plays the content.

Also, the same processing as in (1) above to transfer CSI between client devices may be conducted to transfer CSI from an IC card to on-vehicle device 300. In this case, an IC card not affiliated with AD server 100 may, as with IC card 400 in embodiment 1, be provided with the function of notifying AD server 100 of a transfer. In this case, an IC card that transfers CSI to on-vehicle device 300 prohibits the transfer of CSI without immediately deleting the CSI, and deletes the CSI after notifying AD server 100 of the transfer.

(3) When registering a device not connected to AD server 100 using IC card 400, a permission right or CSI may be transmitted from AD server 100 to IC card 400 via a network.

As one example, when IC card 400 is connected to a client device such as a PC or the like that is connected to a network and has a communication function, IC card 400 conducts SAC establishment processing and receives a permission right or CSI using the communication function of the PC.

The client device having the communication function is not limited to being a PC, and may be a personal digital assistant (PDA), a mobile telephone or the like.

(4) In the above embodiment, contents are either delivered from AD server 100 to a client device or recorded onto a DVD and distributed from AD server 100 to a client device. However, a SAC may be established between client devices and session key SK generated, and contents delivered from one client device to another client device.

(5) In the above embodiment, on-vehicle device 300 is registered using IC card 400. However, withdrawal processing may be conducted in the same way using IC card 400.

In this case, on-vehicle device 300, which has IC card 400 connected thereto, is operated to transmit a withdrawal request to IC card 400, and IC card 400 establishes a SAC to confirm that on-vehicle device 300 is registered, and transmits a deletion notification to on-vehicle device 300. On-vehicle device 300 deletes the CSI, and transmits a deletion-completed notification to IC card 400. IC card 400, on receipt of the deletion-completed notification, stores the ID of the withdrawn on-vehicle device 300. IC card 400, when connected to AD server 100, notifies AD server 100 that on-vehicle device 300 has withdrawn and of the ID of on-vehicle device 300. AD server 100 deletes the ID of on-vehicle device 300 from DEVICE ID in the registration information, subtracts "1" from the registered number, and adds "1" to the remaining number.

(6) In the above embodiment, AD server 100 confirms whether a target device is registered or unregistered by a value of CSI stored by the target device, using signature verification at a time of establishing a SAC. However, AD server 100 may confirm that a target device is registered or unregistered by receiving an ID from the device to be authenticated, and judging whether the received ID is stored in DEVICE ID in the registration information. Also, all of the client devices registered as devices within the authorized domain of AD server 100 may store the registered IDs, and confirm whether other client devices are registered or unregistered by using the IDs in the same way as described above.

(7) In the above embodiment, IC card 400 is used at a time of registering a device that is not connected to AD server 100. However, AD server 100 may display CSI on display unit 114, and a user may manually input the CSI into a client device. In this case, a code to be inputted may be a value obtained by encrypting CSI, depending on the device, the session, and so forth.

(8) In the above embodiment, at a time of establishing a SAC and encrypting and transmitting CSI, signature data of the device transmitting the encrypted CSI may be appended to the ciphertext.

(9) In the above embodiment, registration information and CSI is stored internally in respective devices. However, registration information and CSI may be stored in a removable memory area that cannot be read, written or copied without permission.

(10) In the above embodiment, the ID of a device and CSI or a random number and CSI are concatenated for use as an encryption key at a time of encrypting a content, and as a decryption key at a time of decrypting the encrypted content key. However, the present invention is not limited to this, and an operation may be conducted using the ID of a device and CSI or a random number and CSI, and the resulting value used.

(11) Although in the above embodiment, a maximum number, a registered number and a remaining number are managed as registration information, the present invention is not limited to this.

The maximum number may be set as the initial value of the remaining number and "1" subtracted from the remaining number every time a device is registered, and a client device may be registered if the remaining number is not "0". Also, the maximum number and the registered number may be managed, and a client device registered if the registered number is less than the maximum number.

(12) The maximum number, the registered number, and the like may be managed after dividing the number of devices in the registration information into devices connected online to AD server 100 and devices registered using IC card 400.

(13) Although in the above embodiment, AD server 100 conducts management based on stored registration information, a separate management authority may be provided and structured as in (a) to (c) below.

(a) The management authority sets the maximum number of registerable devices, appends signature data of the management authority to the maximum number, and either records the maximum number onto a portable recording medium such as a DVD for distribution or distributes the maximum number via a communication channel. AD server 100 verifies the signature data, and if verification is successful, stores the maximum number as MAXIMUM in the registration information.

(b) AD server 100 requests the management authority for the number of devices that AD server 100 seeks to register. The management authority conducts accounting in response to the number of devices, and if the accounting is successful, transmits information to AD server 100 permitting registration of the requested number of devices, and AD server 100, on receipt of the information, accepts the registration of client devices within the permitted number.

(c) AD server 100 sends out a request to the management authority every time a registration is received from a client device, and the management authority conducts accounting in response to the request, and permits the registration if the accounting is successful. AD server 100, when registration is permitted, registers the client device and transmits CSI to the client device.

(14) In the above embodiment, playback apparatus 200 plays contents delivered from AD server 100. However, playback apparatus 200 may have a DVD playback function, and play contents recorded onto DVD 500 by AD server 100.

Also, in the above embodiment, AD server 100 joins each of the device IDs stored in the registration information with CSI and uses the result in the encryption of content keys. However, AD server 100 may prestore the ID of devices having a DVD playback function, extract the ID of the devices capable of playing DVD, and concatenate each of these IDs with CSI for use in the encryption of content keys.

(15) Although in the above embodiment, AD server 100 records contents onto a DVD, contents may be recorded onto a memory card, an MD, an MO, a CD, a BD (blu-ray disk) or the like, or onto an IC card.

Also, apart from a playback apparatus, a client device may be a recording device or a combination of a playback apparatus and a recording device. Also, a client device may, apart from being installed in a user's home or mounted in a vehicle, be a portable device capable of being carried by a user.

(16) IC card 400, because of being connected directly to AD server 100 or on-vehicle device 300, need not conduct SAC establishment processing.

(17) In the above embodiment, signature data, at a time of establishing a SAC, is generated with respect to data in which CSI is concatenated to random numbers Cha_B or Cha_A. However, a hash value of data that is to be a signature target may be calculated, and signature data may be generated with respect to this hash value.

(18) In the above embodiment, at a time of establishing a SAC, CSI is used when judging whether a device targeted for authentication is registered or unregistered and when sharing keys. However, CSI need only be used in one of these cases.

Also, although in the above embodiment, authentication is conducted in both directions (i.e. mutually), authentication may be only unidirectional.

(19) Registration of client devices may be restricted by time.

In this case, the time between AD server 100 and a client device is synchronized. AD server 100 sets a time period within which use of CSI is permitted as valid period information, transmits the valid period information and CSI to the client device, and add "1" to the registered number.

The client device receives and stores the valid period information and the CSI. When the period shown by the valid period information ends, the client device deletes the CSI.

AD server 100, once the period shown by the valid period information has ended, subtracts "1" from the registered number. If storing the device ID, AD server 100 deletes the ID of the device whose valid period has expired.

Moreover, the usage period information may show a date-time of the start/end of a usage period, or only the end date-time. Also, the usage period information may be information that sets restrictions on a period from the start of CSI usage, or may set restrictions on a period of operations by a client device using the CSI.

(20) Although there is a single AD server per authorized domain in the above embodiment, there may be a plurality of AD servers in a single authorized domain.

In this case, a client device is able to select which of the AD servers to communicate with. As a selection method, a user may make a setting, or a client device may select the AD server closest in the authorized domain to the client device in terms of distance. Also, a client device may select the AD server having the highest processing capacity or a low number of other tasks.

Also, as described below, an AD server requested for registration by a client device may, when unable to register the client device and the like, search for another AD server that is able to register the client device.

Specifically, the client device transmits a registration request to an AD server. When the registered number in the requested AD server matches the maximum number, the requested AD server makes inquires with another AD server as to whether the other AD server can register the client device. The other AD server, when able to register the client device, registers the client device that requested registration and notifies the requested AD server that registration is possible, and the requested AD server, on receipt of the notification, transmits CSI to the client device.

Also, if the other AD server replies that registration of the client device is not possible, the AD server makes inquiries with yet another AD server.

Also, one AD server may be selected to represent a plurality of AD servers, and the representative server may manage all of the in-group devices. In this case, when an AD server other than the representative server receives a registration request from a client device, the AD server inquires as to whether the client device is registerable in the representative server, and if registerable, the client device is registered in the representative server, and receives CSI from the representative server via the AD server that received the request.

Moreover, if the representative server is currently conducting other operations, or the like, the AD server may inquire with the other AD servers as to whether any of these other AD servers are able to register the client device.

Also, as shown in (a) and (b) below, since a registered number of devices is managed among a plurality of AD servers, the AD servers may share a list relating to registered devices.

(a) When AD servers R and S within the same authorized domain each register client devices, the ID of registered devices are stored as a device list. Also, whenever a list is updated by writing in IDs, the IDs are stored in the device list in correspondence with a version number.

AD servers R and S exchanges device lists regularly or irregularly. AD server R compares the version number of the device list stored therein with the version number of the device list stored by AD server S, and stores the device list having the latest version number. AD server S conducts the same processing. In this way, it is possible for AD servers to always share the latest device list.

Moreover, device lists may be exchanged every time the device list of one of the AD servers is updated. Also, registration information such as registered numbers and maximum numbers may be shared in the same way as above.

(b) AD servers T and U within the same authorized domain hold device lists T and U, respectively, and at a time of registering a client device, store the device IDs of the client devices in correspondence with a registration time. AD servers T and U exchange device lists regularly or irregularly.

AD server T, if the registered number stored therein as registration information is less than the maximum number, writes client devices newly registered in device list U received from AD server U into device list T stored therein, in the order of registration. Also, AD server U, in the same way, receives device list T, and updates device list U in the order in which new client devices were registered.

Moreover, client devices may be provided in advance with a priority level, and priority can be given to the registration of devices having a high priority level. Also, when the combined number of client devices newly registered in AD servers T and U exceeds the maximum number, priority may be given to the registration of devices having a high priority level, or a user may selected devices to be registered.

According to this method, even if the requested AD server is in a power-OFF state, a client device can be registered in another AD server, and consistency maintained by exchanging device lists when the other server is updated, thus making it possible for AD servers to share the same device list.

(21) In order to avoid duplication of CSI among different authorized domains, information exchange may be conducted between AD servers managing the different authorized domains, and confirmation made as to whether or not there is duplication.

Also, in order to improve safety, the AD servers may input respective CSI into a hash function to calculate a hash value, and exchange the hash values to confirm whether or not there is duplication.

Also, instead of AD servers generating CSI, a management authority may be provided, and the management authority may generate the CSI of all of the authorized domains so as to avoid duplication, and send respective CSI to the AD servers in a safe manner.

(22) Client devices may belong to a plurality of authorized domains.

The number of authorized domains in which a client device can register may be restricted by restricting the number of pieces of CSI that the client device is able to store. Also, the present invention may be structured such that the number of authorized domains in which a client device can register is restricted by AD servers exchanging list information that shows registered client devices. Also, exchanging list information makes it is possible to confirm the number of authorized domains to which client devices belong.

Otherwise, a management authority may be provided for managing the number of authorized domains in which a client device registers.

Also, a single AD server may manage a plurality of authorized domains. In this case, the number of pieces of different CSI that an AD server can store is restricted, and the AD server can manage authorized domains within this number. Also, the AD server may store the registerable number of client devices per piece of CSI, or may store pieces of CSI in correspondence with group IDs.

(23) Authorized domains may each be allotted an identifier, and at a time of delivering a content, the device delivering the content may embed the identifier of the authorized domain in which the device is registered in the content as an electronic watermark.

In this way, it is possible to specify which authorized domain the content issued from, in the event of a content decrypted by a client device-being improperly distributed outside of the authorized domain within which it originated. Furthermore, when a server that delivered the content manages the ID of client devices registered in various authorized domains, the ID of the client device that issued the content may be included in the CRL.

(24) Although in the above embodiment, contents are delivered to a device after successfully authenticating the device, the present invention is not limited to this.

Authentication need not be conducted at a time of content delivery in the following cases.

A device on the content transmission end generates an encryption key based on CSI, encrypts a content key using the generated encryption key, and transmits the encrypted content key and an encrypted content that was encrypted using the content key.

A device on the receiving end, on acquiring the encrypted content and encrypted content key, generates based on the CSI, a decryption key the same as the encryption key, decrypts the encrypted content key using the decryption key to obtain a content key, and decrypts the encrypted content using the content key to obtain a content.

In this way, only a device that holds the CSI can generate the decryption key and decrypt the encrypted content.

Also, when an encrypted content is delivered first without authentication being conducted, and then authentication, as in the above embodiment, is conducted later to share a session key, and authentication is successful, the content key may be encrypted using the session key and delivered.

Moreover, the delivery of an encrypted content may be conducted by communication, or by recording the encrypted content onto a portable recording medium.

Also, even when there is no content delivery request or the like from a device on the receiving end, a device on the transmitting end may judge to conduct content delivery or the like, or may conduct content delivery or the like in accordance with an input from outside.

(25) In the above embodiment, a CSI storage unit stores "0" as an initial value, and on receipt of CSI generated by AD server 100, overwrites the initial value with the acquired CSI. However, the initial value and the CSI may be stored in separate areas. Also, when the acquired CSI is stored in a separate area to the initial value, the initial value may be deactivated.

Moreover, the deactivated initial value may be reactivated at a time of deleting CSI due to a transfer, withdrawal, or the like.

Moreover, although the above was described in terms of "0" being stored as a value showing "unregistered", this value need not be "0", and may be any value that differs from the value generated as CSI.

(26) Although in the above embodiment, AD server 100 permits IC card 400 to copy CSI one time, AD server 100 may permit a plurality of copies.

Also, IC card 400 may prevent CSI from being copied to the same client device more than once by, in addition to authenticating client devices using the CSI, storing the ID of client devices to which the CSI has been copied, and confirming the ID of client devices at a time of copying.

Also, an IC card may be implemented with the function of registering client devices, and a device connected to the IC card may operate as an AD server.

Figure 16:
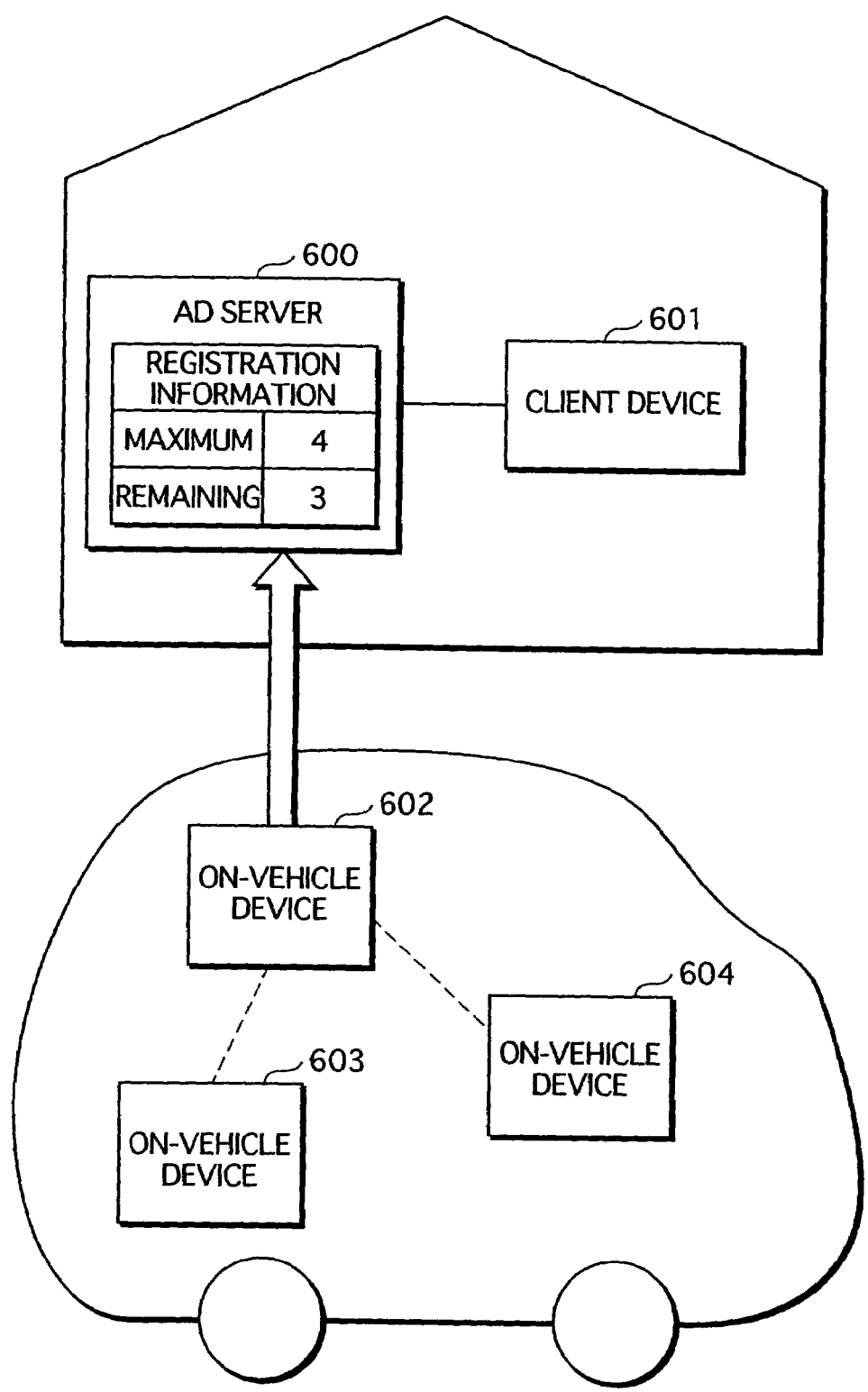
FIG. 16 is a block diagram showing a structure in which a representative device representing a plurality of client devices registers in an AD server 600.

Also, a client device may be registered in an AD server as representing a plurality of client devices, and receive the right to copy CSI to the plurality of client devices. An example of this is shown using FIG. 16.

An AD server 600 and a client device 601 are disposed in the home of a user, and client device 601 is already registered in AD server 600. AD server 600 stores a maximum number and a remaining number as registration information, the maximum number and remaining number in the given example being 4 and 3, respectively.

On-vehicle devices 602, 603 and 604, which are not registered in AD server 600, are mounted in a vehicle owned by the user. On-vehicle devices 603 and 604 do not function to communicate directly with AD server 600. On-vehicle device 602 is portable and does function to communicate directly with AD server 600. Also, on-vehicle devices 602, 603 and 604 are connected to and can communicate with each another.

On-vehicle device 602, when connected to AD server 600 as a representative on-vehicle device, transmits a registration request to AD server 600 that includes a desired number "3", which is the number of client devices on-vehicle device 602 seeks to register.

AD server 600, on receipt of the registration request, authenticates on-vehicle device 602 and shares a session key, the same as in the above embodiment. If authentication is successful, AD server 600 judges whether the desired number in the registration request is less than or equal to the remaining number stored as registration information. If judged to be less than or equal to the remaining number, AD server 600 reads the stored CSI, encrypts the read CSI and permission right permitting the registration of three devices, using the session key, and transmits the encrypted CSI and the encrypted permission right to on-vehicle device 602 as encrypted rights information.

On-vehicle device 602, on receipt of the encrypted rights information, decrypts the encrypted CSI and permission right using the session key to obtain CSI and a permission right. Also, because 1-device worth of the permission right is used in storing the obtained CSI, the permission right stored shows two devices to be registerable. Also, on-vehicle device 602 conducts authentication with on-vehicle devices 603 and 604, and if successful, transmits the CSI to on-vehicle devices 603 and 604 and reduces the number of registerable devices shown in the permission right.

In this way, on-vehicle devices 603 and 604 can be registered as client devices.

Moreover, if the remaining number is less than the desired number, AD server 600 transmits a permission right permitting the registration of devices equal to the remaining number. As an example, when a permission right permitting the registration of two devices is transmitted, on-vehicle device 602 uses the permission right for 1 device in storing the obtained CSI, and uses the remaining permission right for 1 device by transmitting the CSI to one of on-vehicle devices 603 and 604. The device to which the CSI is transmitted may be selected by the user, or each device may have a priority level, and the CSI transmitted to the device having the higher priority level.

Also, at a time of registering on-vehicle devices 602, 603 and 604 in AD server 600, the following processing is conducted when registering an ID of each on-vehicle device in AD server 600.

On-vehicle device 602, before registering, acquires the IDs of on-vehicle devices 603 and 604. On-vehicle device 602, at a time of registering, transmits the acquired IDs and the ID of on-vehicle device 602 to AD server 600. AD server 600 stores the received IDs as device IDs. Also, if the remaining number is less than the desired number, AD server 600 stores, from the received IDs, IDs for how ever many devices is shown by the remaining number. In this case, the user may select which IDs to register, or each ID may have a priority level, and IDs stored in a descending order of priority.

Also, when there is an excess of a permission right, it is possible for on-vehicle device 602 to return the excess to AD server 600.

Moreover, although on-vehicle device 602 is described above as acquiring a permission right that includes the right of on-vehicle device 602, on-vehicle device 602 may register with AD server 600 as described in the above embodiment, and then acquire the right to notify CSI to on-vehicle devices 603 and 604.

(27) A plurality of authorized domains may be combined to form a single authorized domain.

Figure 17:
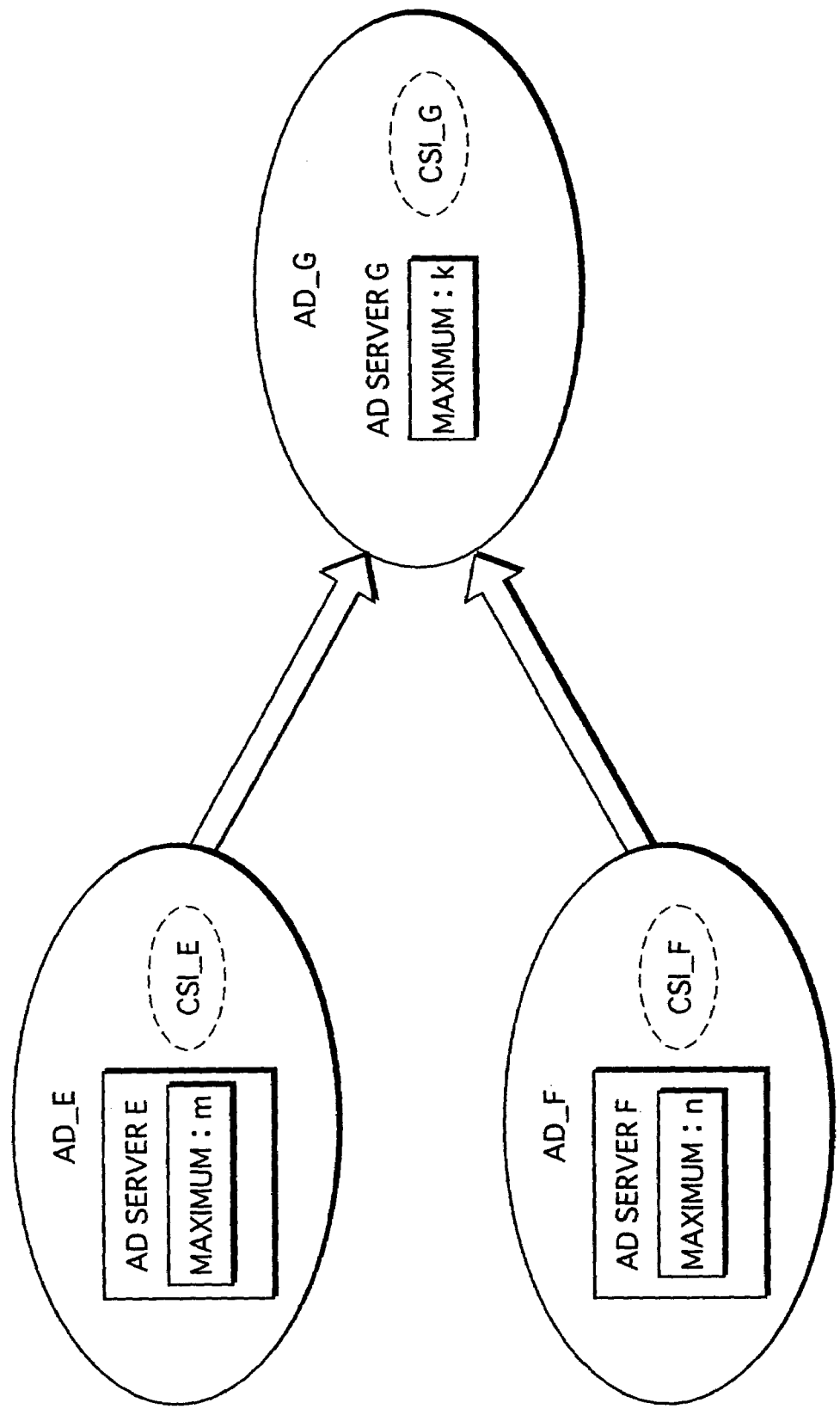
FIG. 17 shows conceptually the formation of a single group from a plurality of groups.

As an example, the combining of AD_E and AD_F to form AD_G is described below using FIG. 17.

AD_E and AD_F are each structured from a single AD server and a plurality of client devices (not depicted). A maximum of "m" number of client devices is registerable in an AD server E in AD_E, and devices registered in AD_E each hold CSI_E. Also, a maximum of "n" number of client devices is registerable in an AD server F in AD_F, and devices registered in AD_F each hold CSI_F.

AD_G is formed from these two authorized domains. First, a device to be AD server G managing AD_G is determined from out of AD servers E and F. At this time, the device to be AD server G may be determined based on processing capacity, priority levels and the like, or may be determined by a user. The AD server that is not AD server G is registered in AD_G as a client device.

A maximum of "k" number of devices registerable in AD server G is set as "m", "n" or the mean of "m" and "n". Also, AD server G newly generates CSI_G, authenticates each of the client devices, and transmits CSI_G to devices that are successfully authenticated.

If the aggregate number of devices forming AD_E and AD_F exceeds the maximum "k", devices for registration are selected. In this case, AD server G may make the selection based on predetermined priority levels, or the user may make the selection.

Moreover, apart from newly forming a single authorized domain from two existing authorized domains, one authorized domain may be added to the other authorized domain. When AD_F is added to AD_E, devices within AD_F are registered in AD server E as AD_E client devices, and hold CSI_E. In this case, if the number of client devices for registration exceeds maximum "m", devices for registration may be selected as described above.

Moreover, "m", "n" and "k" are positive integers.

(28) A single authorized domain may be divided into a plurality of authorized domains.

As an example, the forming of AD_I and AD_J from AD_H is described below using FIG. 18.

AD_H is structured from an AD server H and a plurality of client devices (not depicted).

AD server H is able to register "p" (positive integer) number of client devices, and devices registered in AD_H each store CSI_H.

AD server H, at a time of forming AD_I and AD_J, selects devices to be new AD servers I and J from client devices in AD_H. At this time, devices having a high processing capability may be selected as AD servers, or the selection may be made based on the predetermined priority levels of devices. Also, a user may make the selection, or the selection may be made among client devices based on processing capability, priority levels and the like. Moreover, AD server H may form a new authorized domain as AD server I or AD server J.

After the division, client devices to belong to each authorized domain are selected. At this time, AD servers I and J may make respective selections based on priority levels, or the user may make the selection.

AD servers I and J can each register a maximum of "p" number of client devices. Also, once the client devices of each authorized domain have been selected, AD server I generates CSI_I and transmits the generated CSI_I to selected client devices. Also, AD server J, in the same way, generates CSI_J and transmits the generated CSI_J to selected client devices.

Moreover, AD servers I and J may conduct authentication every time a client device is selected or at a time of transmitting newly generated CSI.

Also, apart from newly forming two authorized domains from a single authorized domain as described above, one new authorized domain may be formed from AD_H, and client devices divided between the original AD_H and the new authorized domain.

(29) When a client device cuts a power supply, the client device may remain registered in an AD server, and CSI temporality deleted.

In this case, once a client device is registered in an AD server, the AD server stores an ID of the client device, and transmits CSI.

The client device, having stored the received CSI, is able to use contents as a device within the authorized domain managed by the AD server. The client device, on receipt of a power-OFF instruction, deletes the CSI and sets power off. At this time, the ID of the client device stored in the AD server is not deleted.

When the power supply of the client device is again set "on", the client device transmits the ID to the AD server. The AD server judges whether an ID matching the received ID exists among IDs stored therein, and again transmits the CSI to the client device without updating the registration information if judged that a matching ID exists.

Moreover, the CSI may also be temporarily deleted in the event of cable or radio communication being interrupted, and when communication is reestablished, the ID may again be transmitted and the CSI again acquired.

(30) Although in the above embodiment, authentication is conducted using CSI, the following authentication processing (a) to (c) may be supplemented.

(a) Authenticate that a client device is connected to the same in-house LAN as an AD server, using a code uniformly provided by a system, or a MAC address, an IP address or the like. In this way, it becomes difficult to register the client device of another user/entity.

Also, when an AD server and a client device conduct radio communication, it may be authenticated that the client device is within range of the radio waves.

Also, when communication is possible between an AD server and a client device, authentication data may be transmitted from the AD server to the client device, and response data transmitted from the client device to the AD server. The AD server may clock the time period from transmission of the authentication data to reception of the response data, and if the clocked time is within a preset threshold, the client device may be authenticated as being located in-house.

Also, time-to-live (TTL) values may be set to be within the number of in-house routers, thus preventing the AD server from being able to communicate with out-house devices.

Also, it may be authenticated whether a client device is located in-house by judging whether the client device is connected to the same power source as the AD server.

(b) Preset a password in an AD server, and at a time of registering a client device, the user manually inputs a password into the client device. The client device transmits a registration request to the AD server that includes the inputted password, and the AD server judges whether the received password included in the registration request matches the preset password.

Also, a plurality of passwords may be set, an example of which is each member of a family setting their own password. Also, an ID identifying a user may be combined with a password.

(c) Instead of a password as in (b) above, biomatrix information such as fingerprints, the iris, and the like may be used. In this way, it becomes possible for only a preset user to register a client device.

(31) An initial value held by a client device may be applied as described in (a) to (c) below.

(a) A client device holds a single initial value showing "not registered in AD server". When the client device registers with the AD server, the initial value is deactivated.

(b) A client device holds a plurality of initial values corresponding one-to-one with a plurality of AD servers. At a time of registering with one of the AD servers, authentication is conducted using an initial value corresponding to the AD server, and if successful and the client device is registered, the corresponding initial value is deactivated. Likewise, if the client device registers in another of the AD servers, an initial value corresponding to the other AD server is deactivated.

Moreover, each initial value may be identified in correspondence with an identifier of a group.

(c) A client device holds a single initial value showing "not registered in any AD server". When the client device registers with an AD server, the initial value is deactivated.

(32) The present invention may be a method showing the above. Also, this method may be computer program realized by a computer, or a digital signal formed from the computer program.

Also, the present invention may be a flexible disk, a hard disk, a CD-ROM, an MO, a DVD, a DVD-ROM, a DVD-RAM, a BD (blu-ray disk), a semiconductor memory or similar computer-readable recording medium that stores the computer program or the digital signal. Also, the present invention may be the computer program or digital signal recorded onto such a recording medium.

Also, the present invention may be the computer program or the digital signal transmitted via a network or the like, representative examples of which include a telecommunication circuit, a radio or cable communication circuit, and the Internet.

Also, the present invention may be a computer system that includes a microprocessor and a memory, the memory storing the computer program and the microprocessor operating in accordance with the computer program.

Also, by transferring the computer program or the digital signal, either recorded on the recording medium or via a network or the like, the present invention may be implemented by another independent computer system.

(33) The present invention may be any combination of the above embodiment and variations.

As described above, the present invention is a group formation/management system that includes one or more registered member devices operable to hold common secret information unique to a group; a new member device operable to transmit a request for registration to the group, and to receive and hold the common secret information; and a group management device operable to receive the registration request from the new member device, and when a registered number of member devices is less than a maximum number of member devices registerable in the group, to register the new member device and output the common secret information to the new member device.

Also, the present invention is a group formation/management system that includes: a member device operable to transmit a request for registration to a group, and to receive and hold common secret information unique to the group; and a group management device operable to receive the registration request from the member device, and when a registered number of member devices is less than a maximum number of member devices registerable in the group, to register the member device and output the common secret information to the member device. Furthermore, in an initial state, the group has no member devices registered therein.

Also, the present invention is a group management device that manages a group, and includes: a reception unit operable to receive from a member device, a request for registration to the group; a judging unit operable, if the member device is authenticated as being a legitimate device, to judge whether a registered number of member devices is less than a maximum number of member devices registerable in the group, and to register the member device when judged in the affirmative; and a communication unit operable, when the judging unit judges in the affirmative, to output to the member device, common secret information unique to the group.

Also, the present invention is a member device that uses a content after registering in a group managed by a group management device, and includes a requesting unit operable to request the group management device for registration to the group; a receiving unit operable to be authenticated by the group management device, and to receive from the group management device, common secret information unique to the group; and a holding unit operable to hold the received common secret information.

According to these structures, because common secret information is outputted to a new member device if the registered member devices are less than the maximum number, it is possible to restrict the number of member devices registered in a group, and rigidly set group parameters.

Here, in the group management device, the judging unit may include an authentication subunit operable to hold a second initial value, and to authenticate the member device, using the second initial value and a first initial value held by the member device; and a device-number judging subunit operable, when authentication is successful, to judge whether the registered number is less than the maximum number. Furthermore, the common secret information outputted by the communication unit may show "registered in the group", and the member device may receive and hold the outputted common secret information, and deactivate the first initial value.

Here, in the group management device, the first and second initial values may show "unregistered in the group".

Here, in the group management device, the first and second initial values may show "unregistered in any group".

Also, in the member device, the holding unit may hold a first initial value, the receiving unit may be authenticated by the group management device using the first initial value, and receive the common secret information from the group management device when authentication is successful, and the holding unit may deactivate the first initial value and hold the received common secret information.

Also, in the member device, the first initial value may show "unregistered in the group".

Also, in the member device, the first initial value may show "unregistered in any group".

Also, in the member device, the holding unit may overwrite the first initial value with the common secret information.

According to these structures, since the group management device conducts authentication using a first initial value held by the member devices and a second initial value held by the group management device, it is possible to judge a member device as not being registered in the group when the member device holds an initial value.

Also, the member device may further include a communication unit operable, after the holding of the common secret information, to output the common secret information to another member device; and a deletion unit operable to delete the held common secret information after the outputting by the communication unit. Furthermore, the holding unit may reactivate the first initial value after the deleting by the deletion unit.

Also, in the member device, the requesting unit may request the group management device for withdrawal from the group, the receiving unit may receive from the group management device, a notification indicating to delete the common secret information, and the holding unit may delete the held common secret information and reactivate the first initial value.

According to these structures, since the member device, having deleted the common secret information, reactivates the first initial value, the member device is able to register in the group as a member device holding an initial value.

Here, the group management device may further include a generating unit operable to generate the common secret information, and the communication unit may output the generated common secret information to the member device.

According to this structure, because the group management device generates the common secret information, it is possible to manage a group using only the devices within the group.

Here, in the group management device, the common secret information may be generated by a management device outside of the group, the judging unit may receive the common secret information from the out-group management device, and the communication unit may output the received common secret information to the member device.

According to this structure, because common secret information is generated by a management device external to the group, it is possible to generate common secret information that does not duplicate the common secret information of other groups.

Here, in the group management device, the reception unit, on receipt of the registration request, may notify the receipt to a management device outside of the group, the out-group management device may judge whether the registered number is less than the maximum number, the judging unit, instead of judging whether the registered number is less than the maximum number, may receive a judgment result from the out-group management device, and the communication unit may output the common secret information to the member device, when the judgment result shows that the registered number is less than the maximum number.

According to this structure, because a management device external to the group judges whether the registered number of devices is fewer than the maximum number, it is possible to reduce the processing by the group management device.

Here, in the group management device, the maximum number may be formed from a first maximum number and a second maximum number, and the judging unit may judge whether the registered number is less than one of the first maximum number and the second maximum number, and register the member device when judged in the affirmative.

Here, in the group management device, the first maximum number may be the number of member devices, out of the maximum number, connectable to the group management device, and the second maximum number may be the number of member devices, out of the maximum number, not connectable to the group management device. Furthermore, the judging unit may judge, (i) when the member device is connectable to the group management device, whether the registered number of connectable member devices is less than the first maximum number, and (ii) when the member device is not connectable to the group management device, whether the registered number of non-connectable member devices is less than the second maximum number.

According to these structures, because the group management device restricts the number of member devices registered in a group based on a first maximum number and a second maximum number, it is possible to manage the number of devices to meet users' wishes.

Here, in the group management device, the communication unit may output to another group management device, a request inquiring whether the member device is registerable in the other group management device, the other group management device may receive the inquiry request, judge whether a registered number of member devices is less than a maximum number of member devices registerable with the other group management device, and when judged in the affirmative, register the member device and output the common secret information to the group management device, and the communication unit, on receipt of the common secret information from the other group management device, may output the received common secret information to the member device.

According to this structure, when a plurality of group management devices exists within a single group, a member device is able to register in the group, even when a group management device requested for registration by the member device is unable to register the member device, since the requested group management device searches for another group management device capable of registering the member device.

Here, in the group management device, the judging unit may function to resist invalid access from outside, and the maximum number and the common secret information may be stored in an area that is unreadable/unwritable from outside.

Also, in the member device, the holding unit may include a storage subunit that is unreadable/unwritable from outside, and the storage subunit may store therein the received common secret information.

Also, in the member device, the storage subunit may be a recording medium mountable in the member device.

According to these structures, because common secret information and the maximum number of registerable devices are stored in a unreadable/unwritable memory unit in the group management device, and because common secret information is also stored in a similar memory unit in the member device, common secret information is held without being disclosed to third parties, rewritten, or the like.

Also, in the group management device, the judging unit may be included in a portable module that is mountable in the group management device.

According to this structure, since a portable module in the group management device judges whether a member device is registerable, it is possible to mount the portable module in an arbitrary device and have the arbitrary device function as an AD server.

Also, in the group management device, the judging unit may store a remaining number obtained by subtracting the registered number from the maximum number, and on receipt by the reception unit of the registration request, judge whether the remaining number is "0", and when judged that the remaining number is not "0", the communication unit may output the common secret information to the member device and the judging unit may subtract "1" from the remaining number.

According to this structure, because a member device is registered when the remaining number is not "0", it is possible to restrict the number of devices registered in a group.

Here, in the group management device, the reception unit, after the outputting of the common secret information, may receive from the member device, a request for withdrawal from the group, the communication unit, on receipt by the reception unit of the withdrawal request, may output to the member device, a notification indicating to delete the common secret information, the reception unit may receive from the member device, a notification showing that deletion of the common secret information has been completed, and the judging unit, on receipt by the reception unit of the deletion-completed notification, may reduce the registered number.

Also, in the member device, the requesting unit may request the group management device for withdrawal from the group, the receiving unit may receive from the group management device, a notification indicating to delete the common secret information, and the holding unit, on acquisition of the deletion notification by the receiving unit, may delete the held common secret information.

According to these structures, because the group management device increases the remaining number when a registered member device withdraws from a group, it is possible to maintain the devices registerable in a group at a regular number because of the registered number being reduced. Also, because withdrawn member devices delete the common secret information, it is possible to prevent content usage by member devices that have withdrawn from a group.

Here, in the group management device, the judging unit may be included in a portable module that is mountable in the group management device.

Also, in the member device, the received common secret information may include information showing a valid period during which use of the common secret information is permitted in the member device, and the holding unit may monitor an elapse of the valid period and delete the common secret information when the valid period ends.

According to these structures, because member devices are only permitted to use a content for a period shown in valid period information, it is possible for each member device to manage common secret information once registration processing has been conducted, even if the member device is not connected online with the group management device. Also, because the common secret information is deleted in the member device, and the registered number is reduced in the group management device, it is possible to maintain the number of devices registerable in a group at a regular level because of the registered number being reduced.

Here, in the group management device, the judging unit may receive from a management device outside of the group, a number of member devices registerable in the group, pay an accounting fee in accordance with the received number, and set the received number as the maximum number.

According to this structure, because the group management device pays an accounting fee at a time of setting the maximum number, the out-group management device is able to conduct accounting in accordance with the number of devices. Also, it is possible to flexibly set the maximum number.

Here, in the group management device, the judging unit may newly acquire from a management device outside of the group, a number of member devices registerable in the group, pay an accounting fee in accordance with the acquired number, and add the acquired number to the maximum number to obtain a new maximum number.

According to this structure, since it is possible to increase the maximum number of registerable devices and conduct accounting in accordance with the increase, it is possible to flexibly manage the number of devices registerable in a group.

Here, in the group management device, the reception unit, after the outputting of the common secret information, may receive a communication request from the member device, the judging unit may authenticate the member device using the common secret information and common secret information held by the member device, and the communication unit may communicate with the member device when authentication is successful.

Also, the member device may further include an authentication unit operable, after the holding of the common secret information, and when the member device communicates with another member device, to authenticate the other member device using the held common secret information and common secret information held by the other member device.

According to these structures, since devices conduct mutual authentication with each other using a value of common secret information held respectively by each of the devices, it is possible to confirm whether the other device is registered in the same group.

Here, the group management device may further include a content storage unit operable to store therein a content key and an encrypted content encrypted using the content key; and an encryption unit operable to encrypt the content key using a key generated based on the common secret information, to generate an encrypted content key. Furthermore, the communication unit may output the encrypted content and the encrypted content key to the member device.

Also, in the member device, the requesting unit may request the group management device for delivery of the content, the receiving unit may receive from the group management device, an encrypted content generated by encrypting the content using a content key, and an encrypted content key generated by encrypting the content key using an encryption key generated based on the common secret information, and the member device may further include a decryption unit operable to generate a decryption key the same as the encryption key, based on the common secret information, to decrypt the encrypted content key using the decryption key to obtain a content key, and to decrypt the encrypted content using the content key to obtain a content.

According to these structures, since a content key is encrypted using a key generated based on common secret information, it is possible to limit the use of contents to devices that hold the common secret information.

Also, in group management device, the judging unit may authenticate the member device using the common secret information and common secret information held by the member device, and share a session key with the member device, using the common secret information, and the encryption unit, when authentication is successful, may encrypt the content key using the shared session key.

According to this structure, since member devices are authenticated using common secret information, it is possible to permit content usage only to devices that can be confirmed as being registered in the same group. Also, because a content key is encrypted using a session key that is dependent on common secret information, contents cannot be used by devices that do not hold the common secret information.

Here, in the group management device, the communication unit may store therein the common secret information, newly receive a different piece of common secret information, overwrite the stored common secret information with the newly received common secret information, and output, regularly or irregularly, the newly received common secret information to the member device.

Also, in the member device, the receiving unit, after the holding of the common secret information, may newly receive a different piece of common secret information from the group management device, and the holding unit may overwrite the held common secret information with the newly received common secret information.

According to these structures, since the common secret information of a group is updated regularly or irregularly, even if the common secret information happens to be disclosed to an external entity, the disclosed common secret information is updated and thus it is possible to prevent content usage by devices that do not hold the updated common secret information.

Here, the group management device may further include a content storage unit operable to store therein a content key and an encrypted content encrypted using the content key; an encryption unit operable to encrypt the content key using a key generated based on the common secret information, to generate an encrypted content key; and a writing unit operable to write the encrypted content and the encrypted content key to a portable recordable medium.

Also, in the group management device, the received registration request may include an identifier identifying the member device, and the encryption unit may encrypt the content key using a key generated based on the common secret information and the identifier, to generate the encrypted content key.

According to these structures, since a content key is encrypted using a key generated based on common secret information, and the encrypted content key is recording onto a portable recordable medium, it is possible to prevent content usage by devices that do not hold the common secret information. Also, since a content key may be encrypted using common secret information and an identifier of a device registered in a group, content usage is only possible by devices whose identifier is registered, and it is thus possible to prevent content usage by other invalid devices.

Here, the group management device may further include a holding unit operable to hold, in correspondence with identifiers that each identify a different group, (i) common secret information unique to the group and (ii) a maximum number of member devices registerable in the group, the received registration request may include one of the identifiers, the judging unit, on receipt by the reception unit of the registration request, may judge whether the number of member devices registered in a group identified by the identifier is less than a maximum number corresponding to the identifier, and when judged in the affirmative, register the member device in the group and select common secret information corresponding to the identifier, and the communication unit may output the selected common secret information to the member device.

According to this structure, it is possible to manage a plurality of groups using a single group management device.

Here, in the group management device, the received registration request may request the registration of a predetermined number of other member devices, the judging unit may judge whether an aggregate number obtained by adding the predetermined number to the registered number is less than the maximum number, and when judged in the affirmative, generate a permission right permitting a copying of the common secret information to the predetermined number of member devices, and the permission right may be attached to the outputted common secret information.

Also, in the member device, the requesting unit may request the group management device for registration of a predetermined number of other member devices, the received common secret information may have attached a permission right permitting a copying of the common secret information to the predetermined number of member devices, the member device may further include a communication unit operable to output the common secret information to another member device, and the holding unit may reduce the number of copies permitted by the permission right by "1" when the common secret information is outputted by the communication unit.

Also, in the member device, the holding unit may hold an identifier unique to the member device, the communication unit may acquire from the other member device, an identifier unique to the other member device, and the requesting unit may transmit the held and acquired identifiers to the group management device.

According to these structures, since a new member device, as the representative of a plurality of member devices, acquires common secret information from a group management device, and confers the common secret information on a predetermined number of other member devices, it is possible to register a plurality of member devices at one time. Also, if the representative member device has a communication function, it is possible to register a predetermined number of other member devices, even if these other member devices do not function to communicate directly with the group management device. Also, since an ID of each member is registered, it is possible to limit the device registering IDs at a time of content delivery and the like.

Here, in the group management device, the received registration request may include a first identifier unique to the member device, the judging unit may store therein the first identifier, the reception unit, after the outputting of the common secret information, may receive a second identifier unique to the member device, the judging unit may judge whether the second identifier matches the first identifier, and the communication unit, when judged that the first and second identifiers match, may again output the common secret information to the member device.

Also, in the member device, the holding unit may hold an identifier unique to the member device, the registration request may include the identifier, the holding unit, on receipt of a power-OFF instruction, may delete the held common secret information and set power off, and on receipt of a power-ON instruction, the requesting unit may again transmit the identifier to the group management device, and the receiving unit may again receive the common secret information from group management device.

Also, in the member device, the holding unit may hold an identifier unique to the member device, the registration request may include the identifier, the holding unit, when communication with the group management device is interrupted, may delete the held common secret information, and when communication with the group management device is reestablished, the requesting unit may again transmit the identifier to the group management device, and the receiving unit may again receive the common secret information from group management device.

According to these structures, since the member device deletes the common secret information when communication is interrupted or when the power supply is turned off, and acquires the common secret information as necessary, improper use of the common secret information is prevented.

Here, in the group management device, when the group management device is determined to be a new group management device for managing a new group formed by combining groups managed by a plurality of group management devices, the communication unit may output to member devices registered in the groups, new common secret information unique to the new group, and when one of the other group management devices is determined to be the new group management device, the group management device may further include a receiving unit operable to receive the new common secret information from the other group management device; and a holding unit operable to hold the received new common secret information.

Also, in the group management device, the communication unit may determine in conjunction with the other group management devices, one of the group management devices to be the new group management device.

Also, in the group management device, the holding unit may store therein a priority level of the group management device, and the communication unit may determine, out of the stored priority level and priority levels of the other group management devices, the group management device having the highest priority level to be the new group management device.

Also, in the member device, the receiving unit, after the holding of the common secret information, may newly receive a different piece of common secret information from one of the group management device and another group management device, and the holding unit may deactivate the held common secret information and holds the newly received common secret information.

According to these structures, it is possible to combine a plurality of groups to form a single group.

Here, in the group management device, each member device registered in the groups managed by the group management device and the other group management devices may have a priority level, and when the group management device is determined to be the new group management device, the reception unit may acquire the priority levels of the member devices, the group management device may further include a selecting unit operable to select, in order from highest to lowest of the acquired priority levels, member devices for registration in the new group, the selected number of member devices being less than or equal to a maximum number of member devices registerable in the new group, and the communication unit may output the new common secret information to the selected member devices.

According to this structure, even if the number of devices exceeds the maximum number when a plurality of groups is combined, it is possible to select member devices for registering by priority levels, and thus restrict the devices to within the maximum number.

Here, in the group management device, the received registration request may include an identifier identifying the member device, and the encryption unit may encrypt the content key using a key generated based on the common secret information and the identifier, to generate the encrypted content key.

Here, the group management device may further include a determining unit operable, after the outputting of the common secret information, to determine a member device registered in the group to be another group management device; and a dividing unit operable to divide member devices registered in the group into member devices to be registered in a group managed by the group management device and member devices to be registered in another group managed by the other group management device. Furthermore, the communication unit may output, after the dividing by the dividing unit, a different piece of common secret information to the member devices to be registered in the group managed by the group management device.

Also, the member device may further include a dividing unit operable, after the holding of the common secret information, and when the member device is determined by the group management device to be another group management device, to divide member devices registered in the group into member devices to be registered in a group managed by the group management device and member devices to be registered in another group managed by the other group management device; and a communication unit operable to output to the member devices to be registered in the other group, common secret information unique to the other group.

Also, the member devices registered in the group may each have a priority level, and in the member device, the receiving unit may acquire the priority levels of the other member devices, and the dividing unit may conduct the dividing based on the acquired priority levels.

According to these structures, it is possible to divide a single group into a plurality of groups.

Here, the member device further includes a communication unit operable, after the holding of the common secret information, to output the common secret information to another member device; and a deletion unit operable to delete the held common secret information after the outputting by the communication unit.

According to this structure, it is possible to exchange member devices registered in a group. Also, because a member device that outputs common secret information to another member device deletes the common secret information, it is possible to maintain the number of member devices holding common secret information; that is, to maintain the number of member devices registered in a group at a regular level.

Here, in the member device, the requesting, receiving and holding units may be included in a portable module that is mountable in the member device and the group management device, and the receiving unit may receive the common secret information from the group management device, when the portable module is mounted in the group management device.

Also, the portable module may further include a notifying unit operable, when the portable module is mounted in the member device, to notify the held common secret information to the member device; and a management unit operable, after the notifying of the held common secret information, to prohibit the notifying unit from again notifying the held common secret information to the member device, and the member device may further include a storage unit operable to receive and store therein the common secret information notified from the portable module.

According to these structures, because a portable module acquires common secret information, it is possible for even a member device that does not function to communicate with the group management device to acquire common secret information using the portable module, and thus to register in a group.

Here, in the member device, the receiving unit may receive from the group management device, an encrypted content encrypted using a content key, and an encrypted content key generated by encrypting the content key using an encryption key generated based on the common secret information, and the member device may further include a decryption unit operable to read the common secret information from the mounted portable module, generate a decryption key the same as the encryption key, based on the read common secret information, decrypt the encrypted content key using the decryption key to obtain a content key, and decrypt the encrypted content using the content key to obtain a content.

According to this structure, it is only possible for a member device to use contents when a portable module is connected. Also, since the portable module acquires common secret information and generates a decryption key, it is possible for an arbitrary device to connect to the portable module and have use contents as an in-group device.

Here, in the member device, the holding unit may hold a maximum holdable number, which is the number of pieces of common secret information holdable by the holding unit, and the requesting unit may request the group management device for registration to the group when the number of pieces of held common secret information is less than the maximum holdable number.

Also, in the member device, the holding unit may hold identifiers that each identify a different group, the registration request may include one of the identifiers, and the holding unit may hold the received common secret information in correspondence with the identifier included in the registration request.

According to these structures, since a member device is able to hold plural pieces of common secret information, it is possible for the member device to register in a plurality of groups. Also, when an identifier of a group is attached to the request for registration, the registering group can be specified.

Also, the present invention is a registration device for registering a member device in a group managed by a group management device, the registration device including: a holding unit operable to receive from the group management device and hold, common secret information unique to the group; and a notifying unit operable, when the registration device is connected to the member device, to notify the common secret information to the member device.

According to this structure, by using a registration device, it is possible for even a member device that is not connectable to a group management device to register in a group.

Here, the registration device may further include a management unit operable, after the notifying of the common secret information, to prohibit the notifying unit from again notifying the common secret information to the member device.

According to this structure, since the renotifying of common secret information is prohibited once the common secret information has been notified to a member device, it is possible to restrict the devices registered in a group to the maximum number.

Here, the registration device may further include a reception unit operable to receive from the member device, a request for acquisition of the common secret information, and the notifying unit may notify the common secret information to the member device when the acquisition request is received by the reception unit.

According to this structure, since common secret information is held by a registration device, and the common secret information is notified when a request is received, it is possible for an arbitrary device to connect to the registration device and have use of contents as an in-group device. Also, because common secret information is held by the registration device and not the member devices, it is possible to restrict the number of in-group devices.

Also, the present invention is a member device that uses a content after registering in a group managed by a group management device, the member device including: a selecting unit operable to select one of a plurality of group management devices based a preset criterion; a requesting unit operable to request the selected group management device for registration to a group; a receiving unit operable to receive, from the selected group management device, common secret information unique to the group; and a holding unit operable to hold the received common secret information. Furthermore, the preset criterion is, with respect to each group management device, one of (i) a distance from the member device, (ii) a communication time with the member device, (iii) a processing capacity, and (iv) a processing state.

According to this structure, when a plurality of group management devices exists within a group, it is possible for a member device to select a group management device having comparatively good conditions, and to register in a group managed by that group management device.

Although the present invention has been fully described by way of examples with reference to the accompanying drawings, it is to be noted that various changes and modifications will be apparent to those skilled in the art.

Therefore, unless such changes and modifications depart from the scope of the present invention, they should be construed as being included therein.

What is claimed is:

1. A group management device that manages a group, comprising:
   a reception unit operable to receive, from a member device, a request for registration in the group;
   a judging unit operable, (i) upon receiving the request, if the member device is authenticated as being a legitimate device, to judge whether a registered number of member devices is less than a maximum number of member devices registerable in the group,
   (ii) when judged in the affirmative, to issue valid period information showing a valid period of use of common secret information, the valid period being unique to the member device, and the common secret information being unique to the group and common among a plurality of member devices registered in the group, and to increase the registered number, and
   (iii) to monitor an elapse of the valid period and reduce the registered number when the valid period ends; and
   a communication unit operable, when judged in the affirmative, to output to the member device, the common secret information and the valid period information.

2. The group management device of claim 1, wherein upon receiving the request, if the member device is authenticated as being the legitimate device, the judging unit judges whether the registered number of member devices is less than a maximum number of member devices registerable in the group, and when judged in the affirmative, the judging unit registers the member device.

3. The group management device of claim 2, wherein the judging unit includes:
   an authentication subunit operable to hold a second initial value, and to authenticate the member device using the second initial value and a first initial value held by the member device; and
   a device-number judging subunit operable, when authentication is successful, to judge whether the registered number is less than the maximum number,
   the common secret information outputted by the communication unit shows "registered in the group", and
   the member device receives and holds the outputted common secret information and deactivates the first initial value.

4. The group management device of claim 3, wherein the first and second initial values show "unregistered in the group".

5. The group management device of claim 3, wherein the first and second initial values show "unregistered in any group".

6. The group management device of claim 2, further comprising:
   a generating unit operable to generate the common secret information, wherein
   the communication unit outputs the generated common secret information to the member device.

7. The group management device of claim 2, wherein
   the common secret information is generated by a management device outside of the group,
   the judging unit receives the common secret information from the out-group management device, and
   the communication unit outputs the received common secret information to the member device.

8. The group management device of claim 2, wherein
   the reception unit, on receipt of the registration request, notifies the receipt to a management device outside of the group,
   the out-group management device judges whether the registered number is less than the maximum number,
   the judging unit, instead of judging whether the registered number is less than the maximum number, receives a judgment result from the out-group management device, and
   the communication unit outputs the common secret information to the member device when the judgment result shows that the registered number is less than the maximum number.

9. The group management device of claim 2, wherein
   the maximum number is formed from a first maximum number and a second maximum number, and
   the judging unit judges whether the registered number is less than one of the first maximum number and the second maximum number, and registers the member device when judged in the affirmative.

10. The group management device of claim 9, wherein the first maximum number is the number of member devices, out of the maximum number, connectable to the group management device, and the second maximum number is the number of member devices, out of the maximum number, not connectable to the group management device, and
    the judging unit judges, (i) when the member device is connectable to the group management device, whether the registered number of connectable member devices is less than the first maximum number, and (ii) when the member device is not connectable to the group management device, whether the registered number of non-connectable member devices is less than the second maximum number.

11. The group management device of claim 2, wherein
    the communication unit outputs to another group management device a request inquiring whether the member device is registerable in the other group management device,
    the other group management device receives the inquiry request, judges whether a registered number of member devices is less than a maximum number of member devices registerable with the other group management device, and when judged in the affirmative, registers the member device and outputs the common secret information to the group management device, and
    the communication unit, on receipt of the common secret information from the other group management device, outputs the received common secret information to the member device.

12. The group management device of claim 2, wherein
the judging unit functions to resist invalid access from outside, and
the maximum number and the common secret information are stored in an area that is unreadable/unwritable from outside.

13. The group management device of claim 10, wherein
the judging unit is included in a portable module that is mountable in the group management device.

14. The group management device of claim 2, wherein
the judging unit stores a remaining number obtained by subtracting the registered number from the maximum number, and on receipt by the reception unit of the registration request, judges whether the remaining number is "0", and when judged that the remaining number is not "0", the communication unit outputs the common secret information to the member device and the judging unit subtracts "1" from the remaining number.

15. The group management device of claim 2, wherein
the reception unit, after the outputting of the common secret information, receives from the member device, a request for withdrawal from the group,
the communication unit, on receipt by the reception unit of the withdrawal request, outputs to the member device a notification indicating to delete the common secret information,
the reception unit receives from the member device a notification showing that deletion of the common secret information has been completed, and
the judging unit, on receipt by the reception unit of the deletion-completed notification, reduces the registered number.

16. The group management device of claim 2, wherein
the judging unit receives from a management device outside of the group, a number of member devices registerable in the group, pays an accounting fee in accordance with the received number, and sets the received number as the maximum number.

17. The group management device of claim 2, wherein
the judging unit newly acquires from a management device outside of the group a number of member devices registerable in the group, pays an accounting fee in accordance with the acquired number, and adds the acquired number to the maximum number to obtain a new maximum number.

18. The group management device of claim 2, wherein
the reception unit, after the outputting of the common secret information, receives a communication request from the member device,
the judging unit authenticates the member device using the common secret information and common secret information held by the member device, and
the communication unit communicates with the member device when authentication is successful.

19. The group management device of claim 2, further comprising:
a content storage unit operable to store therein a content key and an encrypted content encrypted using the content key; and
an encryption unit operable to encrypt the content key using a key generated based on the common secret information, to generate an encrypted content key, wherein
the communication unit outputs the encrypted content and the encrypted content key to the member device.

20. The group management device of claim 19, wherein
the judging unit authenticates the member device using the common secret information and common secret information held by the member device, and shares a session key with the member device, using the common secret information, and
the encryption unit, when authentication is successful, encrypts the content key using the shared session key.

21. The group management device of claim 2, wherein
the communication unit stores therein the common secret information, newly receives a different piece of common secret information, overwrites the stored common secret information with the newly received common secret information, and outputs, regularly or irregularly, the newly received common secret information to the member device.

22. The group management device of claim 2, further comprising:
a content storage unit operable to store therein a content key and an encrypted content encrypted using the content key;
an encryption unit operable to encrypt the content key using a key generated based on the common secret information, to generate an encrypted content key; and
a writing unit operable to write the encrypted content and the encrypted content key to a portable recordable medium.

23. The group management device of claim 22, wherein
the received registration request includes an identifier identifying the member device, and
the encryption unit encrypts the content key using a key generated based on the common secret information and the identifier, to generate the encrypted content key.

24. The group management device of claim 22,
the encryption unit encrypts the content key using a key generated based on the common secret information and an identifier unique to the portable recordable medium.

25. The group management device of claim 2, further including:
a holding unit operable to hold, in correspondence with identifiers that each identify a different group, (i) common secret information unique to the group and (ii) a maximum number of member devices registerable in the group, wherein
the received registration request includes one of the identifiers,
the judging unit, on receipt by the reception unit of the registration request, judges whether the number of member devices registered in a group identified by the identifier is less than a maximum number corresponding to the identifier, and when judged in the affirmative, registers the member device in the group and selects common secret information corresponding to the identifier, and
the communication unit outputs the selected common secret information to the member device.

26. The group management device of claim 2, wherein
the received registration request requests the registration of a predetermined number of other member devices,
the judging unit judges whether an aggregate number obtained by adding the predetermined number to the registered number is less than the maximum number, and when judged in the affirmative, generates a permission right permitting a copying of the common secret information to the predetermined number of member devices, and
the permission right is attached to the outputted common secret information.

27. The group management device of claim 2, wherein
the received registration request includes a first identifier unique to the member device, the judging unit stores therein the first identifier, the reception unit, after the outputting of the common secret information, receives a second identifier unique to the member device, the judging unit judges whether the second identifier matches the first identifier, and the communication unit, when judged that the first and second identifiers match, again outputs the common secret information to the member device.

28. The group management device of claim 2, wherein when the group management device is determined to be a new group management device for managing a new group formed by combining groups managed by a plurality of group management devices, the communication unit outputs to member devices registered in the groups, new common secret information unique to the new group, and when one of the other group management devices is determined to be the new group management device, the group management device further comprises:

a receiving unit operable to receive the new common secret information from the other group management device; and a holding unit operable to hold the received new common secret information.

29. The group management device of claim 28, wherein the communication unit determines, in conjunction with the other group management devices, one of the group management devices to be the new group management device.

30. The group management device of claim 29, wherein the holding unit stores therein a priority level of the group management device, and the communication unit determines, out of the stored priority level and priority levels of the other group management devices, the group management device having the highest priority level to be the new group management device.

31. The group management device of claim 28, wherein each member device registered in the groups managed by the group management device and the other group management devices has a priority level, and when the group management device is determined to be the new group management device, the reception unit acquires the priority levels of the member devices, the group management device further comprises a selecting unit operable to select, in order from highest to lowest of the acquired priority levels, member devices for registration in the new group, the selected number of member devices being less than or equal to a maximum number of member devices registerable in the new group, and the communication unit outputs the new common secret information to the selected member devices.

32. The group management device of claim 2, further comprising:

a determining unit operable, after the outputting of the common secret information, to determine a member device registered in the group to be another group management device; and a dividing unit operable to divide member devices registered in the group into member devices to be registered in a group managed by the group management device and member devices to be registered in another group managed by the other group management device, and the communication unit outputs, after the dividing by the dividing unit, a different piece of common secret information to the member devices to be registered in the group managed by the group management device.

33. A member device that uses a content after registering in a group managed by a group managing device included in a group management system composed of a plurality of member devices including the member device and the group management device, the member device comprising:

a requesting unit operable to request the group management device for registration in the group;

a receiving unit operable to be authenticated by the group management device, and to receive from the group management device, common secret information and valid period information, the common secret information being unique to the group and common among a plurality of member devices registered in the group, and the valid period information showing a valid period of use of the common secret information, and the valid period being unique to the member device; and a holding unit operable to hold the received common secret information, to monitor an elapse of the valid period, and to delete the common secret information when the valid period ends.

34. A group management system comprising:

a group management device; and a plurality of member devices, the group management device including:

a reception unit operable to receive, from a member device, a request for registration in the group;

a judging unit operable, (i) upon receiving the request, if the member device is authenticated as being a legitimate device, to judge whether a registered number of member devices is less than a maximum number of member devices registerable in the group, (ii) when judged in the affirmative, to issue valid period information showing a valid period of use of common secret information, the valid period being unique to the member device, and the common secret information being unique to the group and common among a plurality of member devices registered in the group, and to increase the registered number, and (iii) to monitor an elapse of the valid period, and reduce the registered number when the valid period ends; and a communication unit operable, when judged in the affirmative, to output to the member device, the common secret information and the valid period information, and the group member device including:

a requesting unit operable to request the group management device for registration in the group;

a receiving unit operable to be authenticated by the group management device, and to receive, from the group management device, the common secret information and the valid period information; and a holding unit operable to hold the received common secret information, to monitor the elapse of the valid period, and to delete the common secret information when the valid period ends.

35. A group management method used in a group management device that manages a group, the group management method comprising:

receiving, from a member device, a request for registration in the group;

(i) upon receiving the request, if the member device is authenticated as being a legitimate device, judging whether a registered number of member devices is less than a maximum number of member devices registerable in the group, (ii) when judged in the affirmative, issuing valid period information showing a valid period of use of common secret information, the valid period being unique to the member device, and the common secret information being unique to the group and common among a plurality of member devices registered in the group, and increasing the registered number, and (iii) monitoring an elapse of the valid period and reducing the registered number when the valid period ends; and when judged in the affirmative, outputting to the member device the common secret information and the valid period information.

36. A recording medium storing a computer program used in a group management device that manages a group, the computer program comprising:

receiving, from a member device, a request for registration in the group;

(i) upon receiving the request, if the member device is authenticated as being a legitimate device, judging whether a registered number of member devices is less than a maximum number of member devices registerable in the group, (ii) when judged in the affirmative, issuing valid period information showing a valid period of use of common secret information, the valid period being unique to the member device, and the common secret information being unique to the group and common among a plurality of member devices registered in the group, and increasing the registered number, and (iii) monitoring an elapse of the valid period and reducing the registered number when the valid period ends; and when judged in the affirmative, outputting to the member device, the common secret information and the valid period information.

37. A control method used in a member device that uses a content after registering in a group managed by a group management device included in a group management system composed of a plurality of member devices including the member device and the group management device, the control method comprising:

requesting the group management device for registration in the group;

being authenticated by the group management device and receiving, from the group management device, common secret information valid period information, the common secret information being unique to the group and common among a plurality of member devices registered in the group, and the valid period information showing a valid period of use of the common secret information, and the valid period being unique to the member device; and holding the received common secret information, monitoring an elapse of the valid period, and deleting the common secret information when the valid period ends.

38. A recording medium storing a computer program used in a member device that uses a content after registering in a group managed by a group management device included in a group management system composed of a plurality of member device including the member device and the group management device, the computer program comprising:

requesting the group management device for registration in the group;

being authenticated by the group management device and receiving, from the group management device, common secret information and valid period information, the common secret information being unique to the group and common among a plurality of member devices registered in the group, and the valid period information showing a valid period of use of the common secret information, and the valid period being unique to the member device; and holding the received common secret information, monitoring an elapse of the valid period and deleting the common secret information when the valid period ends.

39. A group management device that manages a group, comprising:

a reception unit operable to receive, from a member device, a request for registration in the group;

a judging unit operable, (i) upon receiving the request, if the member device is authenticated as being a legitimate device, to judge whether a registered number of member devices is less than a maximum number of member devices registerable in the group, (ii) when judged in the affirmative, to issue valid period information showing a valid period of use of common secret information, the valid period being unique to the member device, and the common secret information being unique to the group and common among a plurality of member devices registered in the group, and to increase the registered number, and (iii) to monitor an elapse of the valid period and control the registered number based on a result of the monitoring; and a communication unit operable, when judged in the affirmative, to output to the member device, the common secret information and the valid period information.

40. The group management device of claim 39, wherein the valid period information shows a period in which an off-line device is able to operate as the member device.

* * * * *

UNITED STATES PATENT AND TRADEMARK OFFICE
CERTIFICATE OF CORRECTION

PATENT NO. : 7,441,117 B2  
APPLICATION NO. : 10/649678  
DATED : October 21, 2008  
INVENTOR(S) : Natsume Matsuzaki Page 1 of 1

It is certified that error appears in the above-identified patent and that said Letters Patent is hereby corrected as shown below:

On the Title Page

In section (56), page 2, FOREIGN PATENT DOCUMENTS, column 1, line 4,

"JP 92-97798  11/1997" should read --JP 9-297798  11/1997--.

Signed and Sealed this

Twenty-third Day of October, 2012

David J. Kappos
*Director of the United States Patent and Trademark Office*